US012617128B2

(12) United States Patent
Sakai et al.

(10) Patent No.: US 12,617,128 B2
(45) Date of Patent: May 5, 2026

(54) RELEASE FILM AND METHOD FOR MANUFACTURING RELEASE FILM

(71) Applicant: KOBAYASHI & CO., LTD., Tokyo (JP)

(72) Inventors: Keisuke Sakai, Matsudo-city (JP); Nanae Tanaka, Matsudo-city (JP)

(73) Assignee: KOBAYASHI & CO., LTD., Tokyo (JP)

( * ) Notice: Subject to any disclaimer, the term of this patent is extended or adjusted under 35 U.S.C. 154(b) by 925 days.

(21) Appl. No.: 17/769,702

(22) PCT Filed: Mar. 6, 2020

(86) PCT No.: PCT/JP2020/009726
§ 371 (c)(1),
(2) Date: Apr. 15, 2022

(87) PCT Pub. No.: WO2021/075071
PCT Pub. Date: Apr. 22, 2021

(65) Prior Publication Data
US 2022/0396011 A1 Dec. 15, 2022

(30) Foreign Application Priority Data

Oct. 16, 2019 (JP) ................................. 2019-189755

(51) Int. Cl.
*B29C 33/68* (2006.01)
*C08J 7/04* (2020.01)
(Continued)

(52) U.S. Cl.
CPC ............. *B29C 33/68* (2013.01); *C08J 7/0427* (2020.01); *C08J 7/044* (2020.01); *C08K 3/04* (2013.01);
(Continued)

(58) Field of Classification Search
CPC ...... C08J 7/0427; C08J 7/044; C08J 2327/18; C08J 2427/18; B32B 27/322; B32B 27/36;
(Continued)

(56) References Cited

U.S. PATENT DOCUMENTS

2003/0219604 A1 11/2003 Yamamoto et al. .......... 428/421
2010/0285303 A1* 11/2010 Wu ...................... C09D 127/18
427/407.1
(Continued)

FOREIGN PATENT DOCUMENTS

EP 1 612 021 A1 1/2006
JP H 8-12785 A 1/1996
(Continued)

OTHER PUBLICATIONS

Takamura, Chemistry, Electrochemistry, and Electrochemical Applications | Carbon, in Encyclopedia of Electrochemical Power Sources, Editor(s): Jürgen Garche, Elsevier, 2009, pp. 709-743, retrieved from <https://www.sciencedirect.com/science/article/pii/ B9780444527455008364> on Mar. 21, 2025. (Year: 2009).*
(Continued)

*Primary Examiner* — Monique R Jackson
(74) *Attorney, Agent, or Firm* — Stein IP, LLC

(57) ABSTRACT

To provide a release film having an electrostatic dissipative property. The present invention provides a release film comprising a base layer formed of a polyester resin and a surface layer formed of a tetrafluoroethylene resin that comprises an electrically conductive filler, and the release film has a surface resistivity Rs of $1 \times 10^{11} \Omega$ or less. Preferably, the electrically conductive filler comprises carbon black, and the tetrafluoroethylene resin further comprises particles having an average particle size of 1 μm to 15 μm determined by laser diffraction particle size analysis.

16 Claims, 3 Drawing Sheets

(51) Int. Cl.
*C08J 7/044* (2020.01)
*C08K 3/04* (2006.01)
*C08K 3/36* (2006.01)

(52) U.S. Cl.
CPC ........ *C08K 3/36* (2013.01); *B29K 2995/0005* (2013.01); *C08J 2327/18* (2013.01); *C08K 2201/001* (2013.01); *C08K 2201/005* (2013.01); *C08K 2201/014* (2013.01)

(58) Field of Classification Search
CPC .......... C09D 5/24; C09D 127/18; C08K 3/04; C08K 3/36
See application file for complete search history.

(56) References Cited

U.S. PATENT DOCUMENTS

| | | | |
|---|---|---|---|
| 2016/0368175 A1 | 12/2016 | Kasai et al. | ............ B29C 33/68 |
| 2018/0094118 A1 | 4/2018 | Oota et al. | ........... C08K 5/0091 |
| 2019/0275763 A1 | 9/2019 | Suzuki et al. | ............ B32B 7/06 |
| 2021/0257228 A1 | 8/2021 | Sakai et al. | ........... H01L 21/566 |

FOREIGN PATENT DOCUMENTS

| | | | |
|---|---|---|---|
| JP | 2001-013834 A | 1/2001 | |
| JP | 2001-125262 A | 5/2001 | |
| JP | 2002-280403 A | 9/2002 | |
| JP | 2002-292805 A | 10/2002 | |
| JP | 2003-334903 A | 11/2003 | |
| JP | 2006-049850 A | 2/2006 | |
| JP | 2010-040286 A | 2/2010 | |
| JP | 2014-118514 A | 6/2014 | |
| JP | 2015-074201 A | 4/2015 | |
| JP | 2018-013512 A | 1/2018 | |
| JP | 6515934 B2 | 4/2019 | |
| JP | 6562532 B1 | 8/2019 | |
| KR | 10-2015-0024514 A | 3/2015 | |
| WO | WO 2008/020543 A1 | 2/2008 | |
| WO | WO 2015/133634 A1 | 9/2015 | |
| WO | WO 2016/203890 A1 | 12/2016 | |
| WO | WO 2017/199440 A1 | 11/2017 | |
| WO | WO-2019244447 A1 * | 12/2019 | ............. B29C 33/68 |

OTHER PUBLICATIONS

Spahr, Carbon Black for Electrically Conductive Polymer Applications in: Palsule (eds) Polymers and Polymeric Composites: A Reference Series, Apr. 2016, Springer, Berlin, Heidelberg. https://doi.org/10.1007/978-3-642-37179-0_32-2, pp. 1-26. (Year: 2016).*

Daikin Weatherable coating resin: Zeffle GK-570 Technical Datasheet, Daikin Industries, Ltd., Oct. 2018, retrieved from <https://www.daikinchemicals.com/library/pb_common/pdf/tds/Coatings_resins_and_additives/ZEFFLE_GK_Series/tds-gk-570-E_ver02_Oct_2018.pdf> on Dec. 15, 2025, 2 pages. (Year: 2018).*

Daikin Safety data sheet for ZEFFLE GK-570, Version 5, Daiken Industries, Ltd., Mar. 2023, retrieved from <https://www.daikinchemicals.com/library/pb_common/pdf/sds/Coatings_resins_and_additives/ZEFFLE_GK_Series/sds-GK-570-E_20230322.pdf> on Dec. 15, 2025, 8 pages. (Year: 2023).*

Chinese Office Action served on Jul. 31, 2024, issued to Chinese Patent Application No. 202080072700.5.

International Search Report mailed May 26, 2020, issued to the corresponding International Application No. PCT/JP2020/009726.

Notice of Reasons for Refusal mailed Mar. 25, 2020, issued to the corresponding Japanese Application No. 2019-189755.

Notice of Reasons for Refusal mailed May 11, 2020, issued to the corresponding Japanese Application No. 2019-189755.

Malaysian Office Action dated Jul. 10, 2024, issued by the Intellectual Property Corporation of Malaysia in corresponding application MY PI2022001896.

Singaporean Office Action dated May 22, 2023, issued by the Intellectual Property Office of Singapore in corresponding application SG 11202203759X.

Chinese Office Action mailed Mar. 20, 2024, issued to Chinese Application No. 202080072700.5.

Office Action mailed Jan. 4, 2024, issued to corresponding Taiwan Application No. 109108683.

AA Office Action mailed on Jan. 13, 2025, issued to Chinese Patent Application No. 202080072700.5.

Second Office Action dated May 9, 2025, issued to Malaysian Application No. PI2022001896.

Office Action dated Dec. 10, 2025, issued to Mexican Patent Application No. MX/a/2022/004423.

Filipino Office Action mailed on Jan. 9, 2026, issued by the Intellectual Property Office of the Phillipines Bureau of Patents in corresponding application PH 1/2022/550906.

* cited by examiner

RELEASE FILM AND METHOD FOR MANUFACTURING RELEASE FILM

CROSS-REFERENCE TO RELATED APPLICATIONS

This application is a national stage of International Application No. PCT/JP2020/009726, filed Mar. 6, 2020, which claims the benefit of Japanese Application No. 2019-189755, filed Oct. 16, 2019, in the Japanese Patent Office, the disclosures of which are incorporated herein by reference.

TECHNICAL FIELD

The present invention relates to a release film and a method for manufacturing the film, more specifically relates to a release film used to seal a semiconductor device and a method for manufacturing the film, and further specifically relates to a release film used for transfer molding or compression molding and a method for manufacturing the film.

BACKGROUND ART

In order to seal a semiconductor device with a resin, a molding technique such as transfer molding and compression molding is used. In the molding technique, a release film is often used to facilitate the release of a molded article from a mold after a resin is cured in the mold, and various release films have been developed.

For example, Patent Document 1 discloses a release film that comprises a coated film formed of a composition containing a fluorine resin (A) having a functional group X and a release component (B) and comprises a layer formed of a non-fluorinated polymer.

Patent Document 2 discloses a gas-barrier release film for semiconductor resin molding. The release film at least comprises a release layer (I) having excellent mold release properties and a plastic support layer (II) supporting the release layer. The plastic support layer (II) has a strength of 1 MPa to 50 MPa at 200% elongation at 170° C., and the release film has a xylene gas permeability of $5 \times 10^{-15}$ (kmol·m/(s·m²·kPa)) at 170° C.

CITATION LIST

Patent Documents

Patent Document 1: JP-A No. 2015-74201
Patent Document 2: WO20081020543

SUMMARY OF THE INVENTION

Technical Problem

A release film is used to facilitate the release of a molded article from a mold, as described above. It is desirable that the release film be easily released from a molded article after resin curing.

In manufacturing semiconductor devices, it is necessary to prevent electrostatic destruction of semiconductor devices. The electrostatic destruction is caused by electrostatic discharge (ESD). The destruction of a semiconductor device by ESD may be caused by instantaneous discharge of a charged conductor (or a semiconductor device). ESD causes discharge current to flow in a semiconductor device, and the resulting local heat generation and/or electric field concentration may destruct the semiconductor device. In recent years, rapid progress of miniaturization of semiconductor devices has rendered the semiconductor devices more vulnerable to ESD.

In order to prevent ESD, the manufacturing line of semiconductor devices is provided with an electrostatic destruction preventing means such as an antistatic device. However, to provide the manufacturing line of semiconductor devices with the electrostatic destruction preventing means may increase manufacturing costs. If an electrostatic dissipative property can be imparted to a release film used, for example, in a sealing step of a semiconductor device of the manufacturing steps of the semiconductor device, ESD in the sealing step can be prevented at lower costs.

In view of the above circumstances, the present invention is mainly intended to provide a release film having an electrostatic dissipative property.

Solution to Problem

The inventors of the present invention have found that a release film having a specific configuration has excellent mold release properties and is suitable for an electrostatic dissipative property.

The present invention provides a release film comprising a base layer formed of a polyester resin and a surface layer formed of a tetrafluoroethylene resin comprising an electrically conductive filler, and the release film has a surface resistivity Rs of $1 \times 10^{11} \Omega$ or less.

According to an aspect of the present invention, the electrically conductive filler may comprise carbon black, and the tetrafluoroethylene resin may further comprise particles having an average particle size of 1 μm to 15 μm as determined by laser diffraction particle size analysis.

In the aspect, the carbon black may comprise ketjen black.

The ketjen black may have a DBP oil absorption amount of 250 ml/100 g or more.

The carbon black may further comprise furnace black.

In the aspect, the carbon black may comprise furnace black.

The particles may be inorganic particles.

The inorganic particles may be silicon dioxide particles.

According to another aspect of the present invention, the electrically conductive filler may comprise carbon black, and the carbon black may comprise ketjen black and furnace black.

The polyester resin may be a polyethylene terephthalate resin.

The polyester resin may have a glass transition temperature of 60° C. to 95° C.

The surface layer may be laminated on one face of two faces of the base layer.

On the other face of the two faces of the base layer, a surface layer formed of a fluororesin may be laminated.

The release film of the present invention may be used for sealing a semiconductor device.

In the sealing, the release film may be placed so that the surface layer that is formed of the tetrafluoroethylene resin comprising the electrically conductive filler comes into contact with a sealing resin.

The release film of the present invention may be used for transfer molding or compression molding.

The release film of the present invention may be used for molding two or more times.

The present invention also provides a method for manufacturing a release film. The method comprises a surface layer forming step of forming, on one face of two faces of a base layer that is formed of a polyester resin, a surface layer formed of a tetrafluoroethylene resin comprising an electrically conductive filler, and the manufactured release film has a surface, resistivity Rs of $1 \times 10^{11} \Omega$ or less.

Advantageous Effects of Invention

According to the present invention, a release film having excellent mold release properties and having an electrostatic dissipative property is provided.

The effect of the invention is not necessarily limited to that described in this paragraph and may be any of the effect described in the present description.

DESCRIPTION OF EMBODIMENTS

Figure 1:
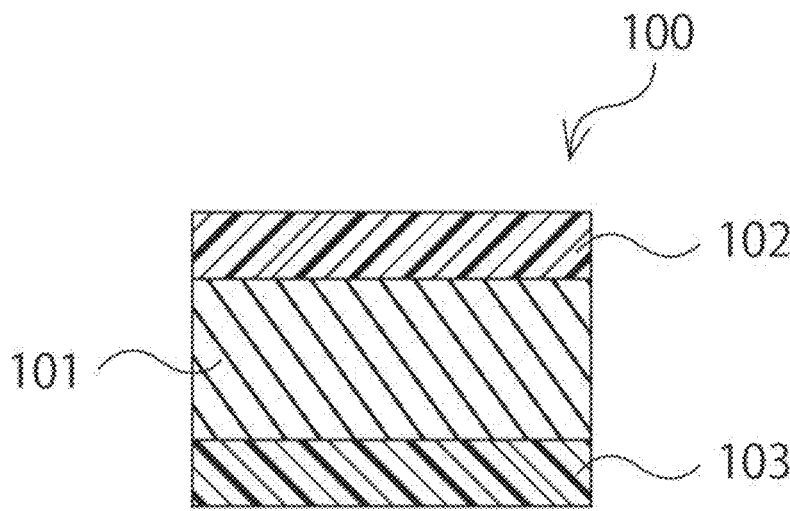
FIG. 1 is a view showing an example structure of a release film of the present invention.

Embodiments for carrying out the present invention will now be described in detail. Embodiments described below are merely examples of typical embodiments of the present invention, and the present invention is not limited to these embodiments.

1. FIRST EMBODIMENT (RELEASE FILM)

(1) Description of First Embodiment

A release film of the present invention comprises a base layer formed of a polyester resin and a surface layer formed of a tetrafluoroethylene resin comprising an electrically conductive filler and has a surface resistivity Rs of $1 \times 10^{11} \Omega$ or less. With the surface layer formed of a tetrafluoroethylene resin comprising an electrically conductive filler, the release film may have a surface resistivity Rs not more than the above upper limit, or the release film can have an electrostatic dissipative property. With a combination of the surface layer and the base layer, the release film of the present invention can exert excellent mold release properties and has an electrostatic dissipative property.

The surface resistivity Rs of the release film of the present invention is, as described above, $1 \times 10^{11} \Omega$ or less and may be preferably less than $1 \times 10^{11} \Omega$, more preferably $1 \times 10^{10} \Omega$ or less, further more preferably $1 \times 10^{9} \Omega$ or less, and particularly preferably $1 \times 10^{8} \Omega$ or less, $5 \times 10^{7} \Omega$ or less, $3 \times 10^{7} \Omega$ or less, or $1 \times 10^{7} \Omega$ or less. The surface resistivity Rs of the release film of the present invention is, for example, $1 \times 10^{3} \Omega$ or more, particularly $5 \times 10^{3} \Omega$ or more, and more particularly $1 \times 10^{4} \Omega$ or more. Having a surface resistivity Rs within the above numerical range, the release film of the present invention can prevent ESD in a sealing step of a semiconductor device. The surface resistivity Rs is determined in accordance with International Electrotechnical Commission (IEC) standard 61340-5-1. The measurement is specifically carried out by the following procedure: first, a 10 cm×10 cm release film sample is prepared; a main measuring electrode (an electrode size of φ50 mm) and a guard electrode (an outer diameter of φ80 mm, an inner diameter of φ70 mm) of, for example, a digital ultra-high resistance meter/microammeter (ADCMT5451, ADC Corporation) are brought into contact with a molded article-side surface layer of the sample; a voltage of 10 V is applied to the sample with these electrodes; and the surface resistivity Rs is determined.

For example, in order to impart an electrostatic dissipative property to a single-layer release film, an electrically conductive filler might be added to a resin that forms the single-layer release film. However, a single-layer release film comprising an electrically conductive filler is likely to have lower film properties (specifically strength and elongation) such as film strength. In addition, such a film may have lower mold release properties. The deterioration in film properties and mold release properties is likely to be observed, for example, in a single-layer release film. For example, a release film used in a sealing step of a semiconductor device essentially has strength, elongation, and mold release properties, and deterioration of these properties is particularly problematic. In addition, when an electrically conductive filler is used as a material of a release film, the film formability or productivity of the single-layer release film may deteriorate to increase costs at the time of film formation. Moreover, an extruder used to form the film is difficult to wash.

In order to impart an electrostatic dissipative property to a release film, a surfactant might be added to a surface layer, for example. However, the surfactant is less effective in imparting electric conductivity, and a tetrafluoroethylene resin has a low compatibility with the surfactant. In addition, when a surface layer contains a surfactant, a release film may have lower physical properties such as mold release properties and durability. In this case, bleedout of a surfactant may contaminate the contact face with the release film. Moreover, a surfactant may fail to exert an electrostatic dissipative property at low humidities, and a surfactant may require humidity control to exert an electrostatic dissipative property.

The release film of the present invention, as described above, has a layer structure comprising a base layer formed of a polyester resin and a surface layer thrilled of a tetrafluoroethylene resin, and the tetrafluoroethylene resin that forms the surface layer comprises an electrically conductive filler. The release film therefore has an electrostatic dissipative property while maintaining excellent physical properties as a release film.

According to one embodiment of the present invention, the electrically conductive filler may comprise carbon black, and the tetrafluoroethylene resin may comprise particles having an average particle size of 1 µm to 15 µm determined by laser diffraction particle size analysis.

When the particles are contained, the electrostatic dissipative property exerted by carbon black may be improved. Hence, when the particles are contained, a smaller amount of carbon black can be used to impart an intended electrostatic dissipative property to the release film. This also contributes to preventing deterioration of physical properties by addition of carbon black to a release film.

The particles contained in the surface layer improves mold release properties of the release film.

The particles contained in addition to carbon black improves dispersibility of the carbon black in the tetrafluoroethylene resin and can improve the appearance of the release film.

In the embodiment, the carbon black preferably comprises ketjen black. When ketjen black is contained, the particles are particularly likely to exert the dispersibility improvement effect. A smaller amount of ketjen black can impart an electrostatic dissipative property than other carbon blacks. Hence, ketjen black can impart an intended electrostatic dissipative property to a release film while suppressing effects on physical properties of the release film.

In the embodiment, the carbon black particularly preferably further comprises furnace black. When ketjen black and furnace black are contained in combination, the effect of improving the appearance of a release film is exerted in addition to the effect described when ketjen black is contained. More specifically, the film surface becomes more uniformly black.

In the embodiment, the carbon black may comprise furnace black. Even when furnace black is contained, the particles can exert dispersibility improvement effect in a tetrafluoroethylene resin. A smaller mass of ketjen black can impart an electrostatic dissipative property than furnace black.

According to another embodiment of the present invention, the electrically conductive filler may comprise carbon black, and the carbon black may comprise ketjen black and furnace black. In the embodiment, the particles having an average particle size of 1 μm to 15 μm and described in the above one embodiment are not necessarily contained. A combination of ketjen black and furnace black can improve, the dispersibility of the carbon black in a tetrafluoroethylene resin without the particles.

According to still another embodiment of the present invention, the electrically conductive filler may comprise carbon black. In the embodiment, the particles having an average particle size of 1 μm to 15 μm and described in the above one embodiment are not necessarily contained. In the embodiment, the carbon black is preferably ketjen black.

In the release film of the present invention, the surface layer formed of a tetrafluoroethylene resin comprising an electrically conductive filler may constitute one surface or each surface.

The surface layer may be laminated on one face of two faces of the base layer (i.e., the surface layer may be laminated directly on the one face of the base layer), or another layer may be interposed between the surface layer and the base layer.

(2) Configuration Example of Release Film of Present Invention

An example structure of the release film of the present invention is shown in FIG. 1. As shown in FIG. 1, a release film 100 of the present invention comprises a base layer 101 and surface layers 102 and 103 laminated on both faces of the base layer.

The base layer 101 is formed of a polyester resin.

The surface layer 102 is formed of a tetrafluoroethylene resin comprising an electrically conductive filler. When used to seal a semiconductor device, the release film 100 is placed so that the surface layer 102 comes into contact with a sealing resin. The surface layer 102 imparts an electrostatic dissipative property to the release film.

The surface layer 103 may for example, be formed of a fluororesin and may preferably be formed of a tetrafluoroethylene resin. The fluororesin that forms the surface layer 103 may comprise no electrically conductive filler or may comprise an electrically conductive filler. When used to seal a semiconductor device, the release film 100 is placed so that the surface layer 103 comes into contact with a mold. Because of the surface layer 103 being formed of a fluororesin, particularly a tetrafluoroethylene resin, the release film 100 can exert excellent mold release properties and can prevent mold contamination (particularly mold contamination by oligomers).

As described above, the release film of the present invention may comprises, for example, a base layer formed of a polyester resin, a first surface layer laminated on one face of the base layer and formed of a tetrafluoroethylene resin comprising an electrically conductive filler, and a second surface layer laminated on the other face of the base layer and formed of a fluororesin (preferably, a tetrafluoroethylene resin).

Another layer may be interposed between the base layer and the first surface layer and/or the second surface layer, but, for example, in order to reduce production costs, the release film of the present invention may have a three-layer structure of the base layer, the first surface layer laminated on the base layer, and the second surface layer laminated on the base layer.

(3) Usage of Release Film of Present Invention

The release film of the present invention may be used for sealing a semiconductor device. In the sealing, the release film is placed so that the surface layer comprising an electrically conductive filler comes into contact with a sealing resin. The release film of the present invention can suppress ESD in the sealing and can prevent electrostatic destruction of a semiconductor device. Hence, the release film of the present invention can eliminate an antistatic device that has been placed around a mold and an apparatus for the sealing and can reduce production costs.

The molding technique for sealing a semiconductor device may appropriately be selected by a person skilled in the art. Examples of the molding technique include transfer molding and compression molding, and the release film of the present invention is suitable for use in such molding. The release film of the present invention may be used, for example, in transfer molding or compression molding while placed between a mold and a resin. In such molding (particularly in a step of curing a sealing resin), the surface layer comprising an electrically conductive filler is in contact with the resin, and the other surface layer is in contact with the mold. The molding temperature during molding where the release film of the present invention is used may for example, be 100° C. to 250° C. and preferably 120° C. to 200° C.

Figure 2:
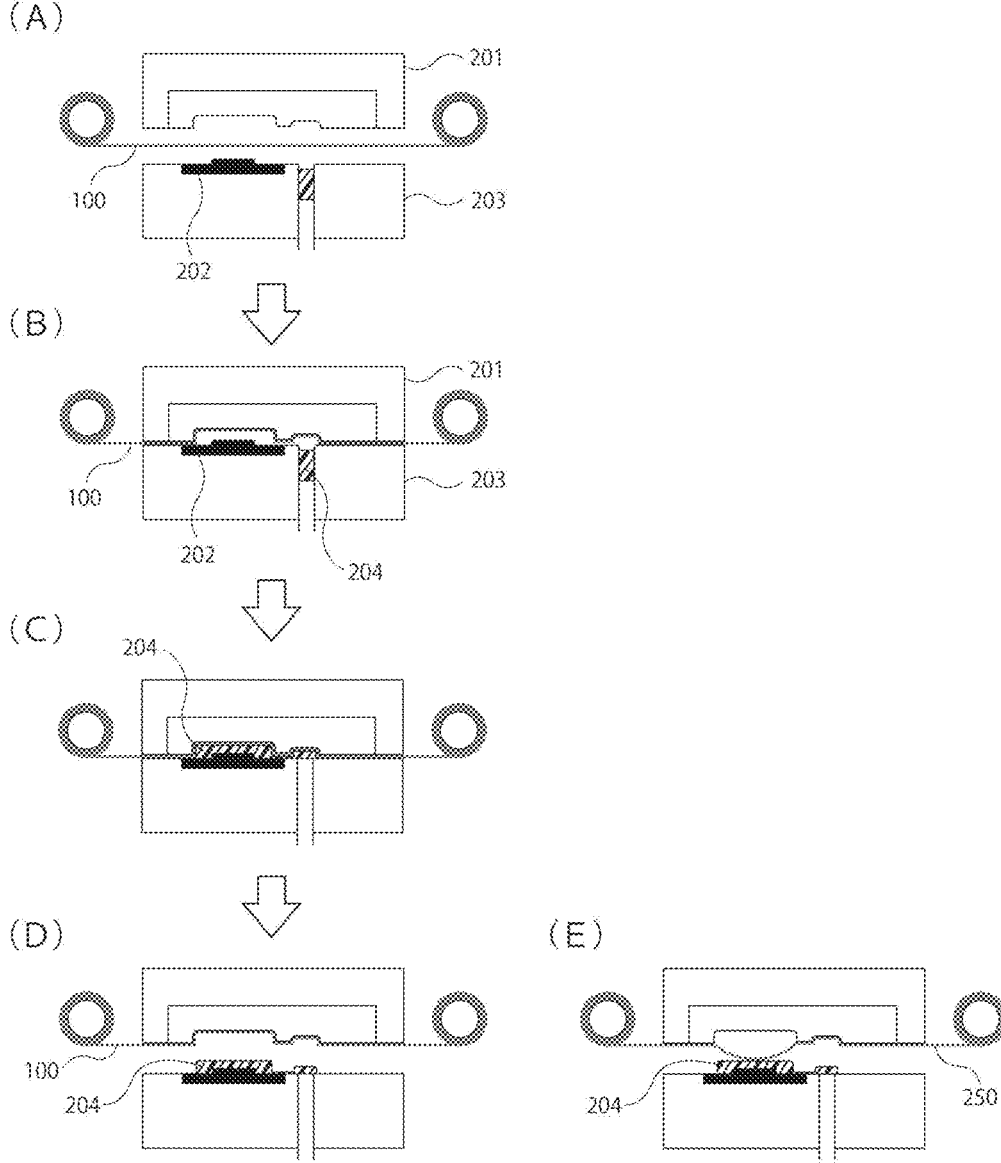
FIG. 2 are views showing an example usage of a release film of the present invention in transfer molding.

An example usage of the release film of the present invention in transfer molding will be described with reference to FIG. 2.

As shown in FIG. 2A, a release film 100 of the present invention is placed between an upper mold 201 and a lower mold 203 with a semiconductor device-loaded substrate 202. The release film 100 is so placed that one surface layer 102 formed of a tetrafluoroethylene resin comprising an electrically conductive filler comes into contact with the resin 204 described later, and the other surface layer 103 comes into contact with the inner face of the upper mold 201 described later.

Next, as shown in FIG. 2B, while the release film 100 is attached onto the inner face of the mold 201, the upper mold 201 is brought into contact with the substrate 202 and the lower mold 203. In this state, the surface layer 108 is in contact with the inner face of the upper mold 201.

Next, as shown in FIG. 2C, a resin 204 is introduced between the upper mold 201 and the substrate 202, and then the resin 204 is cured. In this step, the surface layer 102 formed of a tetrafluoroethylene resin comprising an electrically conductive filler is in contact with the resin 204.

After curing, as shown in FIG. 2D, the upper mold 201 is removed from the substrate 202. The release film of the present invention has excellent mold release properties, and this allows the cured resin 204 to be smoothly released from the upper mold 201 in the step of FIG. 2D.

If having insufficient mold release properties, a release film 250 might adhere to a cured resin 204, for example, as shown in FIG. 2E.

Figure 3:
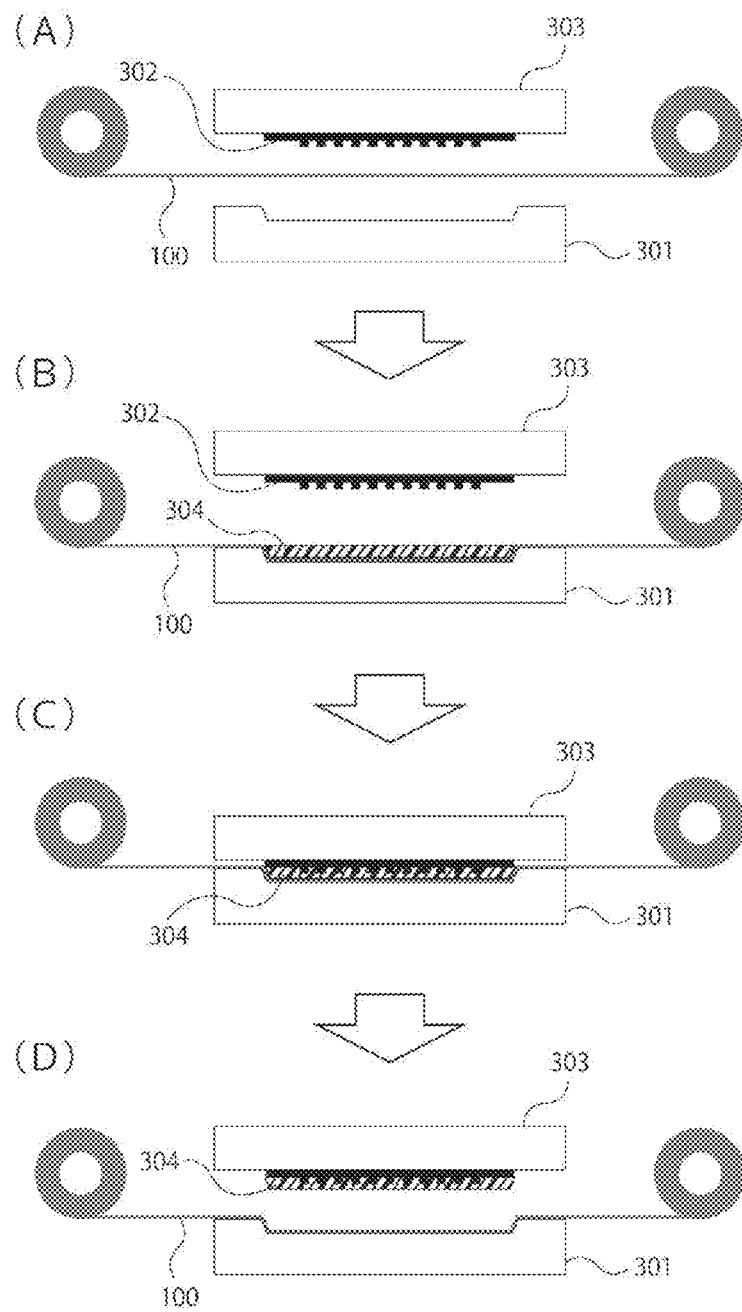
FIG. 3 are views showing an example usage of a release film of the present invention in compression molding.

An example usage of the release film of the present invention in compression molding will be described with reference to FIG. 3.

As shown in FIG. 3A, a release film 100 of the present invention is placed between a lower mold 301 and an upper mold 303 with a semiconductor device-loaded substrate 302. The release film 100 is so placed that one surface layer 102 formed of a tetrafluoroethylene resin comprising an electrically conductive filler comes into contact with the resin 304 described later, and the other surface layer 103 comes into contact with the inner face of the lower mold 301 described later.

Next, as shown in FIG. 3B, while the release film 100 is attached to the inner face of the lower mold 301, a resin 304 is placed in a hollow of the lower mold 301. In this step, the surface layer 102 formed of a tetrafluoroethylene resin comprising an electrically conductive filler is in contact with the resin 304, and the surface layer 103 is in contact with the inner face of the lower mold 301.

As shown in FIG. 3C, the upper mold 303 is moved to be brought into contact with the lower mold 301. Then, the resin 304 is cured.

After curing, as shown in FIG. 3D, the upper mold 303 is removed from the lower mold 301. The release film of the present invention has excellent mold release properties, and this allows the cured resin 304 to be smoothly released from the lower mold 301 in the step of FIG. 3D.

The release film of the present invention may be used for molding of various resins, and may be used, for example, for molding of an epoxy resin or a silicone resin. The type of a resin for forming a molded article may appropriately be selected by a person skilled in the art.

The release film of the present invention may be used for molding, for example, two or more times, preferably four or more times, more preferably five or more times, more preferably six or more times, and even more preferably eight or more times. The release film of the present invention may be used for molding, for example, 2 to 20 times, preferably 4 to 15 times, more preferably 5 to 15 times, more preferably 6 to 15 times, and even more preferably 8 to 12 times. Through multiple release operations, the release film of the present invention maintains its performance and is unlikely to break. Hence, the release film of the present invention can be used in multiple molding processes. This can reduce molding costs.

(4) Details of Layers that Form Release Film of Present Invention

(4-1) Base Layer

The base layer included in the release film of the present invention is formed of a polyester resin. The polyester resin may be a resin containing polyester as a main component. The polyester may, for example, be one of or a mixture of two or more of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), and polyethylene bisphenoxy carboxylate.

Preferably the polyester resin is a polyethylene terephthalate resin. The polyethylene terephthalate resin may be a resin containing polyethylene terephthalate as a main component.

In the present, description, a "main component" is the component contained at the highest content of the components constituting a resin. For example, the main component of a resin being polyester may mean that the content of polyester in the resin is, for example, 50% by mass or more, 60% by mass or more, 70% by mass or more, 80% by mass or more, 90% by mass or more, 95% by mass or more, or 98% by mass or more, relative to the mass of the resin or may mean that the resin is composed of polyester. The main component of a resin being polyethylene terephthalate means substantially the same.

According to a preferred embodiment of the present invention, the base layer included in the release film may be formed of an easily moldable polyethylene terephthalate resin. The easily moldable polyethylene terephthalate resin (also referred to as an easily moldable PET resin) is a term used for referring to a PET resin having greater moldability than that of a conventional polyethylene terephthalate resin. The base layer formed of the easily moldable polyethylene terephthalate resin particularly contributes to making the release film of the present invention have low contamination properties.

According to a preferred embodiment of the present invention, the glass transition temperature of the polyester resin that forms the base layer may preferably be 60° C. to 95° C. and more preferably 65° C. to 90° C. For example, the easily moldable polyethylene terephthalate resin has a glass transition temperature within the above numerical range. The resin that forms the base layer has a glass transition temperature within the above numerical range, and this contributes to making the release film of the present invention usable in molding multiple times.

Conventional polyethylene terephthalates generally have a glass transition temperature of 100° C. or higher. The glass transition temperature of the easily moldable polyethylene terephthalate resin composition is lower than the glass transition temperature of a conventional polyethylene terephthalate.

The glass transition temperature is determined by differential thermal analysis (DTA).

The easily moldable polyethylene terephthalate resin may be a polyethylene terephthalate copolymer resin, for example. The polyethylene terephthalate copolymer may be produced, for example, by reaction of terephthalic acid, ethylene glycol, and a copolymer component or by mixing and melting a polymer as a copolymer component and polyethylene terephthalate and then carrying out distribution reaction.

The copolymer component may be an acid component or may be an alcohol component, for example. Examples of the acid component include aromatic dibasic acids (such as isophthalic acid, phthalic acid, and naphthalenedicarboxylic acid), aliphatic dicarboxylic acids (such as adipic acid, azelaic acid, sebacic acid, and decanedicarboxylic acid), and alicyclic dicarboxylic acids (such as cyclohexanedicarboxylic acid). Examples of the alcohol component include aliphatic diols (such as butanediol, neopentyl glycol, and hexanediol) and alicyclic diols (such as cyclohexanedimethanol). As the copolymer component, these compounds may be used singly or in combination of two or more of them. The acid component may specifically be isophthalic acid and/or sebacic acid.

As the base layer formed of the easily moldable polyethylene terephthalate resin, a commercially available product may be used. For example, Teleflex (trademark) FT, Teleflex (trademark) FT3, and Teleflex (trademark) FW2 (each manufactured by Teijin Film Solutions Ltd.) may be used as the base layer. As the base layer, EMBLET CTK-38 (manufactured by Unitika Ltd.) may also be used.

The base layer formed of the easily moldable polyethylene terephthalate resin may be produced by a method described, for example, in JP-A No. Hei-2-305827, JP-A No. Hei-3-86729, or JP-A No. Hei-3-110124. According to a preferred embodiment of the present invention, the base layer may be produced by biaxial stretching of an easily moldable polyethylene terephthalate resin so as to preferably have a plane orientation coefficient of 0.06 to 0.16, more preferably 0.07 to 0.15, as described in any of the above published documents.

The tensile breaking strength of the base layer, as determined at 175° C. in accordance with JIS K7127, may preferably be 40 MPa to 200 MPa, more preferably 40 MPa to 120 MPa, even more preferably 40 MPa to 110 MPa, and particularly preferably 45 MPa to 100 MPa.

The tensile elongation at break of the base layer, as determined at 175° C. in accordance with JIS K7127, may preferably be 200% to 500%, more preferably 250% to 450%, and even more preferably 300% to 400%.

The base layer having a tensile breaking strength and/or a tensile elongation at break within the above numerical ranges contributes to making the release film of the present invention usable in molding multiple times. A tensile breaking strength and a tensile elongation at break within the above numerical ranges can be achieved by, for example, forming the base layer from an easily moldable polyethylene terephthalate resin. The easily moldable polyethylene terephthalate resin has greater extensibility than a conventional PET resin.

The polyester resin of the base layer is an easily moldable polyethylene terephthalate resin, and thus the release film of the present invention has low contamination properties in molding. In addition, the release film of the present invention may be used for carrying out a molding process multiple times. Effects achieved by the release film of the present invention will next be described in more detail.

A polyethylene terephthalate resin contains oligomers produced in production thereof and having low polymerization degrees. When a release film comprising a layer formed of such a polyethylene terephthalate resin is used to carry out molding, the oligomer may move to the surface of the release film and may contaminate a molded article and/or the surface of a mold. The contamination may be caused even when, for example, a fluorine resin layer is laminated on the surface of the polyethylene terephthalate resin layer. This is thought to be because the oligomer passes through the fluorine resin layer. The contamination is likely to be caused particularly when a single release film is used in carrying out a molding process multiple times. This is thought to be because application of heat to the polyethylene terephthalate resin during molding causes the oligomer to move from the inside of the resin to the surface.

The easily moldable polyethylene terephthalate resin also contains oligomers. However, when the release film of the present invention has a configuration in which a base layer formed of an easily moldable polyethylene terephthalate resin and a surface layer formed of a tetrafluoroethylene resin comprising an electrically conductive filler are laminated, not only an electrostatic dissipative property can be imparted to the release film, but also contamination by the oligomer can be suppressed or prevented. Moreover, the release film of the present invention maintains the electrostatic dissipative property and the low contamination properties through multiple molding operations.

A typical release film is replaced with a fresh film every molding operation. This is because when a release film once used in a molding operation is used in another molding operation, the release film is highly probably broken. Breaking a release film is fatal to molding and can result in an abnormal shape of a molded article or can result in adhesion between a mold and a molded article, for example.

When the release film of the present invention has a configuration in which a base layer formed of an easily moldable polyethylene terephthalate resin and a surface layer formed of a tetrafluoroethylene resin comprising an electrically conductive filler are laminated, the release film is unlikely to be broken and maintains the mold release properties, the electrostatic dissipative property, and the low contamination properties thereof even when used for molding multiple times. Hence, the release film according to the present invention can be used for molding multiple times, and this reduces molding costs.

The thickness of the base layer may, for example, be 10 μm to 80 μm, preferably 15 μm to 75 μm, and more preferably 20 μm to 70 μm. The thickness contributes to making the release film of the present invention usable in molding multiple times.

(4-2) Surface Layer Formed of Tetrafluoroethylene Resin Comprising Electrically Conductive Filler (4-2-1) Tetrafluoroethylene Resin The release film of the present invention comprises a surface layer formed of a tetrafluoroethylene resin comprising an electrically conductive filler. The tetrafluoroethylene resin preferably contains no chlorine. Containing no chlorine improves the durability and/or the antifouling properties of the layer. The tetrafluoroethylene resin may, for example, be a cured product of a tetrafluoroethylene resin composition containing a reactive functional group-containing tetrafluoroethylene polymer and a curing agent.

The reactive functional group-containing tetrafluoroethylene polymer contained in the tetrafluoroethylene resin composition may be a tetrafluoroethylene polymer that is curable by the curing agent. The reactive functional group and the curing agent may appropriately be selected by a person skilled in the art.

The reactive functional group may, for example, be a hydroxy group, a carboxyl group, the group represented by —COOCO—, an amino group, or a silyl group and is preferably a hydroxy group. Such a group allows a reaction for giving the cured product to satisfactory proceed.

Of these reactive functional groups, a hydroxy group is particularly suitable to the reaction for giving the cured product. In other words, the reactive functional group-containing tetrafluoroethylene polymer may preferably be a hydroxy group-containing tetrafluoroethylene polymer.

The fluorine-containing unit of the reactive functional group-containing tetrafluoroethylene polymer is preferably a fluorine-containing unit based on a perfluoroolefin. The fluorine-containing unit based on the perfluoroolefin may more preferably be based on one, two, or three selected from tetrafluoroethylene (tetrafluoroethylene, also referred to as "TFE" in the present description), hexafluoropropylene (HFP), and perfluoro(alkyl vinyl ethers) (PAVEs). Preferably of the fluorine-containing units based on the perfluoroolefin, the amount of a fluorine-containing unit based on TFE is the largest.

The hydroxy value of the reactive functional group-containing tetrafluoroethylene polymer (particularly the hydroxy value of the hydroxy group-containing tetrafluoroethylene polymer) may preferably be 10 mg KOH/g to 300 mg KOH/g, more preferably 10 mg KOH/g to 200 mg KOH/g, and even more preferably 10 mg KOH/g to 150 mg KOH/g. The reactive functional group-containing tetrafluoroethylene polymer having a hydroxy value not less than the lower limit of the above numerical range may make the resin composition have good curing properties. The reactive functional group-containing tetrafluoroethylene polymer having a hydroxy value not more than the upper limit of the above numerical range may contribute to making the resin composition give a cured product that is suitable for multiple molding operations. The hydroxy value is determined by a method in accordance with JIS K 0070.

The acid value of the reactive functional group-containing tetrafluoroethylene polymer (particularly the acid value of the hydroxy group-containing tetrafluoroethylene polymer) may preferably be 0.5 mg KOH/g to 100 mg KOH/g and more preferably 0.5 mg KOH/g to 50 mg KOH/g. The reactive functional group-containing tetrafluoroethylene polymer having an acid value not less than the lower limit of the above numerical range may make the resin composition have good curing properties. The reactive functional group-containing tetrafluoroethylene polymer having an acid value not more than the upper limit of the above numerical range may contribute to making the resin composition give a cured product that is suitable for multiple molding operations.

The reactive functional group of the reactive functional group-containing tetrafluoroethylene polymer may be introduced into the tetrafluoroethylene polymer by copolymerization of a monomer having the reactive functional group with a fluorine-containing monomer (particularly the above perfluoroolefin). In other words, the reactive functional group-containing tetrafluoroethylene polymer may contain a polymer unit based on a reactive functional group-containing monomer and a polymer unit based on a fluorine-containing monomer (particularly the above perfluoroolefin).

When the reactive functional group is a hydroxy group, the monomer having the reactive functional group may preferably be a hydroxy group-containing vinyl ether or a hydroxy group-containing allyl ether. Examples of the hydroxy group-containing vinyl ether include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether; and 6-hydroxyhexyl vinyl ether, and examples of the hydroxy group-containing allyl ether include 2-hydroxyethyl allyl ether, 4-hydroxybutyl allyl ether, and glycerol monoallyl ether. Alternatively the monomer having the reactive functional group may, for example, be a hydroxyalkyl ester of (meth)acrylic acid, such as 2-hydroxyethyl acrylate and 2-hydroxyethyl methacrylate. As the monomer having the reactive functional group, these compounds may be used singly or in combination of two or more of them. When the reactive functional group is a hydroxy group, the monomer having the reactive functional group may more preferably be a hydroxy group-containing vinyl ether and specifically preferably 4-hydroxybutyl vinyl ether and/or 2-hydroxyethyl vinyl ether from the viewpoint of curing properties of the resin composition.

When the reactive functional group is a carboxyl group, the monomer having the reactive functional group may preferably be an unsaturated carboxylic acid, an ester of an unsaturated carboxylic acid, or an acid anhydride of an unsaturated carboxylic acid.

When the reactive functional group is an amino group, the monomer having the reactive functional group may for example, be an amino vinyl ether or allylamine.

When the reactive functional group is a silyl group, the monomer having the reactive functional group may preferably be a silicone type vinyl monomer.

The fluorine-containing monomer is preferably a perfluoroolefin. Examples of the perfluoroolefin include tetrafluoroethylene (TFE), hexafluoropropylene (HFP), and perfluoro(alkyl vinyl ethers) (PAVEs). Preferably, the fluorine-containing monomer comprises TFE.

Preferably the reactive functional group-containing tetrafluoroethylene polymer may contain, in addition to the polymer unit based on a reactive functional group-containing monomer and the polymer unit based on a fluorine-containing monomer, a polymer unit based on a fluorine-free vinyl monomer. The fluorine-free vinyl monomer may, for example, be a single monomer or a combination of two or more monomers selected from vinyl carboxylates, alkyl vinyl ethers, and non-fluorinated olefins.

Examples of the vinyl carboxylate include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butylbenzoate.

Examples of the alkyl vinyl ether include methyl vinyl ether, ethyl vinyl ether, butyl vinyl ether, and cyclohexyl vinyl ether.

Examples of the non-fluorinated olefin include ethylene, propylene, n-butene, and isobutene.

The reactive functional group-containing tetrafluoroethylene polymer may contain, in addition to the polymer unit based on a reactive functional group-containing monomer and the polymer unit based on a fluorine-containing monomer as a perfluoroolefin, a polymer unit based on a fluoromonomer other than the perfluoroolefin, such as vinylidene fluoride (VdF), chlorotrifluoroethylene (CTFE), vinyl fluoride (VF), and fluorovinyl ether.

The reactive functional group-containing tetrafluoroethylene polymer may, for example, be a TFE/non-fluorinated olefin/hydroxybutyl vinyl ether copolymer, a TFE/vinyl carboxylate/hydroxybutyl vinyl ether copolymer, or a TFE/alkyl vinyl ether/hydroxybutyl vinyl ether copolymer.

More specifically, the reactive functional group-containing tetrafluoroethylene polymer may be a TFE/isobutylene/hydroxybutyl vinyl ether copolymer, a TFE/vinyl versatate/hydroxybutyl vinyl ether copolymer, or a TFE/VdF/hydroxybutyl vinyl ether copolymer. The reactive functional group-containing tetrafluoroethylene polymer may particularly preferably be a TFE/isobutylene/hydroxybutyl vinyl ether copolymer or a TFE/vinyl versatate/hydroxybutyl vinyl ether copolymer.

As the reactive functional group-containing tetrafluoroethylene polymer, for example, a product in a Zeffle GK series may be used.

The curing agent contained in the tetrafluoroethylene resin composition may appropriately be selected by a person skilled in the art depending on the type of a reactive functional group contained in the reactive functional group-containing tetrafluoroethylene polymer.

When the reactive functional group is a hydroxy group, the curing agent may preferably be a single agent or a combination of two or more agents selected from isocyanate curing agents, melamine resins, silicate compounds, and isocyanate group-containing silane compounds.

When the reactive functional group is a carboxyl group, the curing agent may preferably be a single agent or a combination of two or more agents selected from amino curing agents and epoxy curing agents.

When the reactive functional group is an amino group, the curing agent may be a single agent or a combination of two or more agents selected from carbonyl group-containing curing agents, epoxy curing agents, and acid anhydride curing agents.

The content of the curing agent in the tetrafluoroethylene resin composition may for example, be 15 parts by mass to 50 parts by mass, preferably 20 parts by mass to 40 parts by mass, and more preferably 23 parts by mass to 35 parts by mass relative to 100 parts by mass of the reactive functional group-containing tetrafluoroethylene polymer. These numerical ranges apply also to the content of the curing agent in a cured product of the tetrafluoroethylene resin composition.

The content of the curing agent may be determined by pyrolysis gas chromatography (Py-GC/MS).

In an embodiment of the present invention, the reactive functional group contained in the reactive functional group-containing tetrafluoroethylene polymer may be a hydroxy group, and the curing agent may be an isocyanate curing agent. In the embodiment, the isocyanate curing agent is preferably a hexamethylene diisocyanate (HDI) polyisocyanate.

The content of the HDI polyisocyanate in the tetrafluoroethylene resin composition may for example, be 15 parts by mass to 50 parts by mass, preferably 20 parts by mass to 40 parts by mass, and more preferably 23 parts by mass to 35 parts by mass relative to 100 parts by mass of the reactive functional group-containing tetrafluoroethylene polymer. These numerical ranges apply also to the content of the HDI polyisocyanate in a cured product of the tetrafluoroethylene resin composition.

As the HDI polyisocyanate, for example, a single polyisocyanate or a combination of two or more polyisocyanates selected from isocyanurate-type polyisocyanates, adduct-type polyisocyanates, and biuret-type polyisocyanates may be used. In the present invention, the isocyanate curing agent may preferably be an isocyanurate-type polyisocyanate and/or an adduct-type polyisocyanate and more preferably a combination of an isocyanurate-type polyisocyanate and an adduct-type polyisocyanate.

When a combination of an isocyanurate-type polyisocyanate and an adduct-type polyisocyanate is used as the curing agent, the mass ratio thereof is, for example, 10:6 to 10:10 and preferably 10:7 to 10:9. The total amount thereof may for example, be 15 parts by mass to 50 parts by mass, preferably 20 parts by mass to 40 parts by mass, and more preferably 25 parts by mass to 35 parts by mass relative to 100 parts by mass of the reactive functional group-containing tetrafluoroethylene polymer.

The content ratio of these curing agents may be determined by pyrolysis gas chromatography (Py-GC/MS).

(4-2-2) Electrically Conductive Filler

The tetrafluoroethylene resin that forms the surface layer comprises an electrically conductive filler. The electrically conductive filler may, for example, be a single filler of or a combination of two or more fillers selected from electrically conductive metal fillers, electrically conductive carbon fillers, electrically conductive metal-oxide fillers, and electrically conductive metal-plated fillers.

Examples of the electrically conductive metal filler include electrically conductive powder fillers such as silver, copper, nickel, tin, and silver-plated copper powders and electrically conductive fibrous fillers such as copper, stainless steel, aluminum, brass, and iron fibers. Examples of the electrically conductive carbon filler include electrically conductive powder fillers such as carbon black and graphite and electrically conductive fibrous fillers such as carbon nanotubes (CNTs) and carbon fibers. Examples of the electrically conductive metal-oxide filler include electrically conductive powder fillers such as tin oxide, indium oxide, and zinc oxide powders. Examples of the electrically conductive metal-plated filler include electrically conductive powder fillers such as metal-plated glass beads and metal-plated mica powder and electrically conductive fibrous fillers such as metal-plated glass fibers and metal plated carbon fibers.

The electrically conductive filler is preferably the electrically conductive carbon filler and may, for example, be the above-described electrically conductive carbonaceous powder filler or electrically conductive carbonaceous fibrous filler.

The content of the electrically conductive filler in the tetrafluoroethylene resin composition may, for example, be 1 part by mass to 25 parts by mass and preferably 1 part by mass to 23 parts by mass relative to 100 parts by mass of the reactive functional group-containing tetrafluoroethylene polymer. These numerical ranges apply also to the content of the electrically conductive filler in a cured product of the tetrafluoroethylene resin composition.

The electrically conductive filler preferably comprises carbon black. The electrically conductive filler may only consist of carbon black. As the carbon black, for example, a single carbon black or a combination of two or more carbon blacks selected from ketjen black, furnace black, acetylene black, channel black, thermal black, and lamp black may be used. The electrically conductive filler preferably comprises one or both of ketjen black and furnace black. Ketjen black and furnace black are particularly suitable to impart an electrostatic dissipative property to the release film of the present invention.

Ketjen black has a small primary particle size and a hollow structure and thus has a large loading amount per unit weight. Hence, a small amount of ketjen black imparts an electrostatic dissipative property to a release film.

According to a preferred embodiment of the present invention, the carbon black contained in the tetrafluoroethylene resin that forms the surface layer comprises ketjen black. The carbon black may only consist of ketjen black, for example.

When the electrically conductive filler comprises ketjen black, the content of the ketjen black in the tetrafluoroethylene resin composition may, for example, be 1 part by mass to 25 parts by mass, preferably 1 part by mass to 10 parts by mass, and more preferably 3 parts by mass to 8 parts by mass relative to 100 parts by mass of the reactive functional group-containing tetrafluoroethylene polymer. These numerical ranges apply also to the content of the ketjen black in a cured product of the tetrafluoroethylene resin composition.

When the tetrafluoroethylene resin that forms the surface layer comprises ketjen black but comprises no particles described later in "(4-2-3) Particles", the content of the ketjen black is preferably 3 parts by mass or more relative to 100 parts by mass of the reactive functional group-containing tetrafluoroethylene polymer. This can make the release film have a surface resistivity Rs of, for example, $1 \times 10^8 \Omega$ or less, particularly $5 \times 10^7 \Omega$ or less. In this case, the content of the ketjen black is, for example, 3 parts by mass to 15 parts by mass and more preferably 5 parts by mass to 10 parts by mass relative to 100 parts by mass of the reactive functional group-containing tetrafluoroethylene polymer.

When the tetrafluoroethylene resin that forms the surface layer comprises ketjen black and comprises particles (particularly silicon dioxide particles) described later in "(4-2-3) Particles", the content of the ketjen black may be 1 part by mass or more relative to 100 parts by mass of the reactive functional group-containing tetrafluoroethylene polymer. When the particles and the ketjen black are used in combination, a smaller content of ketjen black can make the release film have a surface resistivity Rs of, for example, $1 \times 10^8 \Omega$ or less, particularly $5 \times 10^7 \Omega$ or less. A combination of the particles and the ketjen black can improve the dispersibility of the ketjen black in the tetrafluoroethylene resin composition. This improves the surface appearance of the release film.

According to a particularly preferred embodiment of the present invention, the carbon black contained in the tetrafluoroethylene resin that forms the surface layer comprises ketjen black and furnace black. The carbon black may only consist of a combination of ketjen black and furnace black, for example.

When the electrically conductive filler comprises ketjen black and furnace black, the content of the ketjen black in the tetrafluoroethylene resin composition may preferably be 1 part by mass to 10 parts by mass, more preferably 2 parts by mass to 9 parts by mass, and even more preferably 3 parts by mass to 8 parts by mass relative to 100 parts by mass of the reactive functional group-containing tetrafluoroethylene polymer. These numerical ranges apply also to the content of the ketjen black in a cured product of the tetrafluoroethylene resin composition. In this case, the content of the furnace black in the tetrafluoroethylene resin composition may, for example, be 1 part by mass to 25 parts by mass, preferably 3 parts by mass to 20 parts by mass, and more preferably 5 parts by mass to 18 parts by mass relative to 100 parts by mass of the reactive functional group-containing tetrafluoroethylene polymer. These numerical ranges apply also to the content of the furnace black in a cured product of the tetrafluoroethylene resin composition.

When the tetrafluoroethylene resin that forms the surface layer comprises ketjen black and furnace black but comprises no particles described later in "(4-2-3) Particles", the content of the ketjen black may preferably be 1 part by mass to 10 parts by mass, more preferably 2 parts by mass to 9 parts by mass, and even more preferably 3 parts by mass to 8 parts by mass preferably relative to 100 parts by mass of the reactive functional group-containing tetrafluoroethylene polymer. These numerical ranges apply also to the content of the ketjen black in a cured product of the tetrafluoroethylene resin composition. In this case, the content of the furnace black in the tetrafluoroethylene resin composition may, for example, be 1 part by mass to 25 parts by mass, preferably 3 parts by mass to 20 parts by mass, and more preferably 5 parts by mass to 18 parts by mass relative to 100 parts by mass of the reactive functional group-containing tetrafluoroethylene polymer. Adopting contents within these numerical ranges can make the release film have a surface resistivity Rs of, for example, $1 \times 10^8 \Omega$ or less, particularly $5 \times 10^7 \Omega$ or less.

When the tetrafluoroethylene resin that forms the surface layer comprises ketjen black and furnace black and comprises particles (particularly silicon dioxide particles) described later in "(4-2-3) Particles", the content of the ketjen black in the tetrafluoroethylene resin composition may preferably be 1 part by mass to 8 parts by mass, more preferably 2 parts by mass to 7 parts by mass, and even more preferably 3 parts by mass to 6 parts by mass relative to 100 parts by mass of the reactive functional group-containing tetrafluoroethylene polymer. These numerical ranges apply also to the content of the ketjen black in a cured product of the tetrafluoroethylene resin composition. In this case, the content of the furnace black in the tetrafluoroethylene resin composition may for example, be 1 part by mass to 25 parts by mass, preferably 3 parts by mass to 20 parts by mass, and more preferably 5 parts by mass to 18 parts by mass relative to 100 parts by mass of the reactive functional group-containing tetrafluoroethylene polymer. Adopting contents within these numerical ranges can make the release film have a surface resistivity Rs of, for example, $1 \times 10^8 \Omega$ or less, particularly $5 \times 10^7 \Omega$ or less.

The DBP oil absorption amount of the ketjen black is preferably 250 ml/100 g or more, more preferably 280 ml/100 g or more, and even more preferably 300 ml/100 g or more. The DBP oil absorption amount of the ketjen black may for example, be 1,000 ml/100 g or less, particularly 800 ml/100 g or less, and more particularly 600 ml/100 g or less.

In the present description, a DBP oil absorption amount is the value determined by a method in accordance with JIS K6217-4.

The iodine adsorption number of the ketjen black is preferably 500 mg/g or more, more preferably 600 mg/g or more, and even more preferably 700 mg/g or more. The iodine adsorption number of the ketjen black is preferably 1,500 mg/g or less, more preferably 1,400 mg/g or less, and even more preferably 1,200 mg/g or less.

In the present description, an iodine adsorption number is the value determined by a method in accordance with JIS K6217-1.

The ketjen black is preferably powder. A powder ketjen black improves the appearance of a surface layer. The powder ketjen black may preferably have an average particle size of 1 μm to 20 μm, more preferably 3 μm to 17 μm, even more preferably 5 μm to 15 μm, and particularly preferably 7 μm to 13 μm determined by laser diffraction particle size analysis. The average particle size is a volume average diameter weighted by volume and is determined in accordance with JIS Z8825. The average particle size may be determined, for example, with a particle size analyser (SALD-2200, Shimadzu Corporation). It is thought that such fine particles contained at a content within the above numerical range contributes to improving the dispersibility and/or improving the appearance.

The porosity of the ketjen black is preferably 50% by volume or more, more preferably 52% by volume or more, and even more preferably 55% by volume or more. The porosity of the ketjen black is, for example, 90% by volume or less, particularly 85% by volume or less, and more particularly 80% by volume or less. In the present description, the porosity is the ratio of the volume of pores to the total volume of carbon and pores and is expressed by the following formula.

$$\text{Porosity (\% by volume)} = A/(A+B) \times 100$$

(A: pore volume per unit mass ($cm^3$/g); B: carbon volume per unit mass ($cm^3$/g))

A is a gas adsorption (physical adsorption) amount determined with a pore distribution analyzer. B is the reciprocal of a true density (g/$cm^3$), and the true density is determined by a pycnometer method.

According to a preferred embodiment, the carbon black contained in the tetrafluoroethylene resin that forms the surface layer comprises furnace black in addition to ketjen black. The carbon black may only consist of ketjen black and furnace black, for example. When the carbon black comprises ketjen black and furnace black, the release film has a better appearance. More specifically, the release film surface becomes more uniformly black.

The DBP oil absorption amount of the furnace black is preferably 200 ml/100 g or less, more preferably 150 ml/100 g or less, and even more preferably 100 ml/100 g or less. The DBP oil absorption amount of the furnace black may for example, be 40 ml/100 g or more, particularly 50 ml/100 g or more, and more particularly 60 ml/100 g or more. The DBP oil absorption amount is a value determined by a method in accordance with JTZ K6217-4.

The nitrogen adsorption specific surface area of the furnace black is preferably 10 $m^2$/g to 70 $m^2$/g, more preferably 15 $m^2$/g to 50 $m^2$/g, and even more preferably 20 $m^2$/g to 40 $m^2$/g determined in accordance with JIS K6217-2.

The furnace black is preferably powder. A powder furnace black improves the appearance of a surface layer. The powder furnace black may preferably have an average particle size of 30 nm to 150 nm, more preferably 50 nm to 100 nm, even more preferably 60 nm to 90 nm, and particularly preferably 70 nm to 80 nm determined by electron microscopy. The average particle size is a volume-average diameter weighted by volume and is determined in accordance with JIS Z8825. The average particle size may be determined, for example, with a particle size analyser (SALD-2200, Shimadzu Corporation). It is thought that such fine particles contained at a content within the above numerical range contributes to improving the dispersibility and/or improving the appearance.

A mixed liquid of the furnace black with distilled water may preferably have a pH of 5.5 to 8.5, more preferably 6 to 8, and even more preferably 6.5 to 7.5 determined with a glass electrode meter.

(4-2-3) Particles

The tetrafluoroethylene resin that forms the surface layer preferably comprises particles having an average particle size of 1 μm to 15 μm, more preferably 1 μm to 12 μm, and even more preferably 2 μm to 10 μm determined by laser diffraction particle size analysis. The particles are particles other than the electrically conductive filler and are, for example, particles other than carbon black. The average particle size is a volume average diameter weighted by volume and is determined in accordance with JIS Z8825. The average particle size may be determined, for example, with a particle size analyser (SALD-2200, Shimadzu Corporation). When containing the particles, a resin containing a smaller amount of carbon black can impart an intended electrostatic dissipative property to a release film. When the particles are contained, the dispersibility of the electrically conductive filler can be improved in the tetrafluoroethylene resin. An improvement of the dispersibility can improve the surface appearance of the release film. The particles can also improve mold release properties of the release film.

The particles are preferably inorganic particles or organic particles. Examples of the inorganic particles include particles of silicon dioxide (particularly amorphous silicon dioxide), calcium carbonate, magnesium carbonate, calcium phosphate, kaolin, talc, aluminum oxide, titanium oxide, alumina, barium sulfate, calcium fluoride, lithium fluoride, zeolite, and molybdenum sulfide. Examples of the organic particles include cross-linked polymer particles and calcium oxalate particles. In the present invention, the particles are preferably inorganic particles, more preferably silicon dioxide particles, and even more preferably amorphous silicon dioxide particles. The amorphous silicon dioxide may be a sol-gel type silica. As the amorphous silicon dioxide, for example, an amorphous silicon dioxide in a Sylysia series may be used.

The content of the particles in the tetrafluoroethylene resin composition may for example, be 3 parts by mass to 30 parts by mass, preferably 4 parts by mass to 25 parts by mass, and more preferably 5 parts by mass to 20 parts by mass relative to 100 parts by mass of the reactive functional group-containing tetrafluoroethylene polymer. These numerical ranges apply also to the content of the particles in a cured product of the tetrafluoroethylene resin composition.

The content of the particles may be determined by thermogravimetric analysis (TGA).

(4-2-4) Other Components

The tetrafluoroethylene resin composition may comprise a solvent. The solvent type may appropriately be selected by a person skilled in the art. Examples of the solvent include butyl acetate, ethyl acetate, and methyl ethyl ketone (also referred to as MEK). For example, a mixture of these three solvents may be used as the solvent.

The tetrafluoroethylene resin composition may comprise a release accelerator. Examples of the release accelerator include an amino modified-methylpolysiloxane, an epoxy modified-methylpolysiloxane, a carboxy modified-methylpolysiloxane, and a carbinol modified-methylpolysiloxane. Preferably the release accelerator is an amino modified-methylpolysiloxane.

The content of the release accelerator may, for example, be 0.01 part by mass to 3 parts by mass, preferably 0.05 part by mass to 2 parts by mass, more preferably 0.1 part by mass to 1 part by mass relative to 100 parts by mass of the reactive functional group-containing tetrafluoroethylene polymer. These numerical ranges apply also to the content of the release accelerator in a cured product of the tetrafluoroethylene resin composition.

(4-2-5) Formation of Surface Layer

The thickness of the surface layer may, for example, be 1 μm to 10 μm, preferably 2 to 9 μm, and more preferably 3 μm to 8 μm.

The tetrafluoroethylene resin composition may be produced by mixing and stirring the above-described components by means known by a person skilled in the art. For the mixing and stirring, for example, a mixer such as a high-speed mixer, a homomixer, and a paint shaker may be used. For the mixing and stirring, for example, a dissolver such as an edge-turbine high-speed dissolver may also be used.

A cured product of the tetrafluoroethylene resin composition may be obtained as follows: the tetrafluoroethylene resin composition is applied to a surface of the base layer, and is heated, for example, at 100° C. to 200° C., preferably at 120° C. to 180° C., for example, for 10 seconds to 240 seconds, preferably for 30 seconds to 120 seconds. The cured product forms the surface layer. The application amount of the tetrafluoroethylene resin composition may appropriately be set by a person skilled in the art depending on the thickness of a surface layer to be formed.

The surface layer that is formed of the tetrafluoroethylene resin comprising the electrically conductive filler comes into contact with a molded article in production of the molded article. In the present description, the surface layer is also referred to as a molded article-side surface layer. The other surface layer (the surface layer to come into contact with a mold in production of a molded article) is also referred to as a mold-side surface layer.

In a preferred embodiment of the present technique, the molded article-side surface layer comprises a cured product of a fluororesin composition containing the reactive functional group-containing tetrafluoroethylene polymer (particularly a hydroxy group-containing tetrafluoroethylene polymer), the curing agent, the particles, the release accelerator, and the electrically conductive filler.

More preferably, the molded article-side surface layer comprises a cured product of a tetrafluoroethylene resin composition containing a hydroxy group-containing tetrafluoroethylene polymer, an HDI polyisocyanate, silicon dioxide particles, an amino modified-methylpolysiloxane, and carbon black.

The molded article-side surface layer particularly contributes to making the release film of the present invention have an excellent electrostatic dissipative property and mold release properties.

(4-3) Mold-Side Surface Layer (4-3-1) Fluororesin

The mold-side surface layer of the release film of the present invention may, for example, be formed of a fluororesin. According to a preferred embodiment of the present invention, the fluororesin contains no chlorine. Containing no chlorine improves the durability and/or the antifouling properties of the layer. The fluororesin may, for example, be a cured product of a fluororesin composition containing a reactive functional group-containing fluoropolymer and a curing agent.

The fluororesin preferably contains a tetrafluoroethylene resin and more preferably contains a tetrafluoroethylene resin as a main component. In the present description, the tetrafluoroethylene resin is a component produced by curing reaction of the reactive functional group-containing tetrafluoroethylene polymer described below with a curing agent. A tetrafluoroethylene resin being a main component means that the fluororesin is composed of the tetrafluoroethylene resin or the content of the tetrafluoroethylene resin is the highest among the components of the fluororesin. For example, the content of the tetrafluoroethylene resin in the fluororesin may, for example, be 70% by mass or more, preferably 75% by mass or more, more preferably 80% by mass or more, and particularly preferably 85% by mass or more relative to the total mass of the fluororesin. The content may, for example, be 99% by mass or less, particularly 98% by mass or less, and more particularly 97% by mass or less relative to the total mass of the fluororesin.

When the fluororesin is a tetrafluoroethylene resin, the mold-side surface layer may be the same as the surface layer formed of a tetrafluoroethylene resin comprising an electrically conductive filler described in "(4-2) Surface layer formed of tetrafluoroethylene resin comprising electrically conductive filler", for example.

The reactive functional group-containing fluoropolymer contained in the fluororesin composition may be a fluoropolymer that is curable by the curing agent. The reactive functional group and the curing agent may appropriately be selected by a person skilled in the art.

The reactive functional group may, for example, be a hydroxy group, a carboxyl group, the group represented by —COOCO—, an amino group, or a silyl group and is preferably a hydroxy group. Such a group allows a reaction for giving the cured product to satisfactory proceed.

Of these reactive functional groups, a hydroxy group is particularly suitable to the reaction for giving the cured product. In other words, the reactive functional group-containing fluoropolymer may preferably be a hydroxy group-containing fluoropolymer and more preferably a hydroxy group-containing tetrafluoroethylene polymer.

The fluorine-containing unit of the reactive functional group-containing fluoropolymer is preferably a fluorine-containing unit based on a perfluoroolefin. The fluorine-containing unit based on the perfluoroolefin may more preferably be based on one, two, or three selected from tetrafluoroethylene (tetrafluoroethylene, also referred to as "TFE" in the present description), hexafluoropropylene (HFP), and perfluoro(alkyl vinyl ethers) (PAVEs). Preferably of the fluorine-containing units based on the perfluoroolefin, the amount of a fluorine-containing unit based on TFE is the largest.

The hydroxy value of the reactive functional group-containing fluoropolymer (particularly the hydroxy value of the hydroxy group-containing fluoropolymer) may preferably be 10 mg KOH/g to 300 mg KOH/g, more preferably 10 mg KOH/g to 200 mg KOH/g, and even more preferably 10 mg KOH/g to 150 mg KOH/g. The reactive functional group-containing fluoropolymer having a hydroxy value not less than the lower limit of the above numerical range may make the resin composition have good curing properties. The reactive functional group-containing fluoropolymer having a hydroxy value not more than the upper limit of the above numerical range may contribute to making the resin composition give a cured product suitable for multiple molding operations. The hydroxy value is determined by a method in accordance with JIS K 0070.

The acid value of the reactive functional group-containing fluoropolymer (particularly the acid value of the hydroxy group-containing fluoropolymer) may preferably be 0.5 mg KOH/g to 100 mg KOH/g and more preferably 0.5 mg KOH/g to 50 mg KOH/g. The reactive functional group-containing fluoropolymer having an acid value not less than the lower limit of the above numerical range may make the resin composition have good curing properties. The reactive functional group-containing fluoropolymer having an acid value not more than the upper limit of the above numerical range may contribute to making the resin composition give a cured product suitable for multiple molding operations.

The reactive functional group of the reactive functional group-containing fluoropolymer may be introduced into the fluoropolymer by copolymerization of a monomer having the reactive functional group with a fluorine-containing monomer (particularly the above perfluoroolefin). In other words, the reactive functional group-containing fluoropolymer may contain a polymer unit based on a reactive functional group-containing monomer and a polymer unit based on a fluorine-containing monomer (particularly the above perfluoroolefin).

When the reactive functional group is a hydroxy group, the monomer having the reactive functional group may preferably be a hydroxy group-containing vinyl ether or a hydroxy group-containing allyl ether. Examples of the hydroxy group-containing vinyl ether include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 6-hydroxypentyl vinyl ether, and 6-hydroxyhexyl vinyl ether, and examples of the hydroxy group-containing hydroxy group-containing allyl ether include 2-hydroxyethyl allyl ether, 4-hydroxybutyl allyl ether, and glycerol monoallyl ether. Alternatively, the monomer having the reactive functional group may, for example, be a hydroxyalkyl ester of (meth)acrylic acid, such as 2-hydroxyethyl acrylate and 2-hydroxyethyl methacrylate. As the monomer having the reactive functional group, these compounds may be used singly or in combination of two or more of them. When the reactive functional group is a hydroxy group, the monomer having the reactive functional group may more preferably be a hydroxy group-containing vinyl ether and specifically preferably 4-hydroxybutyl vinyl ether and/or 2-hydroxyethyl vinyl ether from the viewpoint of curing properties of the resin composition.

When the reactive functional group is a carboxyl group, the monomer having the reactive functional group may preferably be an unsaturated carboxylic acid, an ester of an unsaturated carboxylic acid, or an acid anhydride of an unsaturated carboxylic acid.

When the reactive functional group is an amino group, the monomer having the reactive functional group may, for example, be an amino vinyl ether or allylamine.

When the reactive functional group is a silyl group, the monomer having the reactive functional group may preferably be a silicone vinyl monomer.

The fluorine-containing monomer is preferably a perfluoroolefin. Examples of the perfluoroolefin include tetrafluoroethylene (TFE), hexafluoropropylene (HFP), and perfluoro(alkyl vinyl ethers) (PAVEs). Preferably the fluorine-containing monomer comprises TFE.

Preferably, the reactive functional group-containing fluoropolymer may contain, in addition to the polymer unit based on a reactive functional group-containing monomer and the polymer unit based on a fluorine-containing monomer, a polymer unit based on a fluorine-free vinyl monomer. The fluorine-free vinyl monomer may for example, be a single monomer or a combination of two or more monomers selected from vinyl carboxylates, alkyl vinyl ethers, and non-fluorinated olefins.

Examples of the vinyl carboxylate include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butylbenzoate.

Examples of the alkyl vinyl ether include methyl vinyl ether, ethyl vinyl ether, butyl vinyl ether, and cyclohexyl vinyl ether.

Examples of the non-fluorinated olefin include ethylene, propylene, n-butene, and isobutene.

The reactive functional group-containing fluoropolymer may contain, in addition to the polymer unit based on a reactive functional group-containing monomer and the polymer unit based on a fluorine-containing monomer as a perfluoroolefin, a polymer unit based on a fluoromonomer other than the perfluoroolefin, such as vinylidene fluoride (VdF), chlorotrifluoroethylene (CTFE), vinyl fluoride (VF), and fluorovinyl ether.

The reactive functional group-containing fluoropolymer may, for example, be a TFE/non-fluorinated olefin/hydroxybutyl vinyl ether copolymer, a TFE/vinyl carboxylate/hydroxybutyl vinyl ether copolymer, or a TFE/alkyl vinyl ether/hydroxybutyl vinyl ether copolymer.

More specifically the reactive functional group-containing fluoropolymer may be a TFE/isobutylene/hydroxybutyl vinyl ether copolymer, a TFE/vinyl versatate/hydroxybutyl vinyl ether copolymer, or a TFE/VdF/hydroxybutyl vinyl ether copolymer. The reactive functional group-containing fluoropolymer may particularly preferably be a TFE/isobutylene/hydroxybutyl vinyl ether copolymer or a TFE/vinyl versatate/hydroxybutyl vinyl ether copolymer.

As the reactive functional group-containing fluoropolymer, for example, a product in a Zeffle GK series may be used.

The curing agent contained in the fluororesin composition may appropriately be selected by a person skilled in the art depending on the type of a reactive functional group contained in the reactive functional group-containing fluoropolymer.

When the reactive functional group is a hydroxy group, the curing agent may preferably be a single agent or a combination of two or more agents selected from isocyanate curing agents, melamine resins, silicate compounds, and isocyanate group-containing silane compounds.

When the reactive functional group is a carboxyl group, the curing agent may preferably be a single agent or a combination of two or more agents selected from amino curing agents and epoxy curing agents.

When the reactive functional group is an amino group, the curing agent may be a single agent or a combination of two or more agents selected from carbonyl group-containing curing agents, epoxy curing agents, and acid anhydride curing agents.

The content of the curing agent in the fluororesin composition may for example, be 15 parts by mass to 50 parts by mass, preferably 20 parts by mass to 40 parts by mass, and more preferably 23 parts by mass to 35 parts by mass relative to 100 parts by mass of the reactive functional group-containing fluoropolymer. These numerical ranges apply also to the content of the curing agent in a cured product of the fluororesin composition.

The content of the curing agent may be determined by pyrolysis gas chromatography (Py-GC/MS).

In an embodiment of the present invention, the reactive functional group contained in the reactive functional group-containing fluoropolymer may be a hydroxy group, and the curing agent may be an isocyanate curing agent. In the embodiment, the isocyanate curing agent is preferably a hexamethylene diisocyanate (HDI) polyisocyanate.

The content of the HDI polyisocyanate in the fluororesin composition may, for example, be 15 parts by mass to 50 parts by mass, preferably 20 parts by mass to 40 parts by mass, and more preferably 23 parts by mass to 35 parts by mass relative to 100 parts by mass of the reactive functional group-containing fluoropolymer. These numerical ranges apply also to the content of the HDI polyisocyanate in a cured product of the fluorine resin composition.

As the HDI polyisocyanate, for example, a single polyisocyanate or a combination of two or more polyisocyanates selected from isocyanurate-type polyisocyanates, adduct-type polyisocyanates, and biuret-type polyisocyanates may be used. In the present invention, the isocyanate curing agent may preferably be an isocyanurate-type polyisocyanate and/or an adduct-type polyisocyanate and more preferably a combination of an isocyanurate-type polyisocyanate and an adduct-type polyisocyanate.

When a combination of an isocyanurate-type polyisocyanate and an adduct-type polyisocyanate is used as the curing agent, the mass ratio thereof is, for example, 10:6 to 10:10 and preferably 10:7 to 10:9. The total amount thereof may, for example, be 15 parts by mass to 50 parts by mass, preferably 20 parts by mass to 40 parts by mass, and more preferably 25 parts by mass to 35 parts by mass relative to 100 parts by mass of the reactive functional group-containing fluoropolymer.

The content ratio of these curing agents may be determined by pyrolysis gas chromatography (Py-GC/MS).

(4-3-2) Particles

The fluororesin that forms the surface layer preferably comprises particles having an average particle size of 1 µm to 15 µm, more preferably 1 µm to 12 µm, and even more preferably 2 µm to 10 µm determined by laser diffraction particle size analysis. The average particle size is a volume average diameter weighted by volume and is determined in accordance with JIS Z8825. The average particle size may be determined, for example, with a particle size analyser (SALD-2200, Shimadzu Corporation). The particles can improve mold release properties of the release film.

The particle type is as described in "(4-2-3) Particles", and the explanation thereof applies also to the particles contained in the mold-side surface layer. The explanation of the particles is thus omitted.

The content of the particles in the fluororesin composition may for example, be 10 parts by mass to 30 parts by mass, preferably 12 parts by mass to 25 parts by mass, and more preferably 15 parts by mass to 20 parts by mass relative to 100 parts by mass of the reactive functional group-containing fluoropolymer. These numerical ranges apply also to the content of the particles in a cured product of the fluorine resin composition.

The content of the particles may be determined by thermogravimetric analysis (TGA).

(4-3-3) Other Components

The fluororesin composition may comprise a solvent. The solvent type is as described in "(4-2-4) Other components", and the explanation thereof applies also to the solvent contained in the mold-side surface layer.

The fluororesin composition may comprise a release accelerator. The release accelerator type is as described in "(4-2-4) Other components", and the explanation thereof applies also to the release accelerator contained in the mold-side surface layer. The content of the release accelerator may, for example, be 0.01 part by mass to 3 parts by mass, preferably 0.05 part by mass to 2 parts by mass, and more preferably 0.1 part by mass to 1 part by mass relative to 100 parts by mass of the reactive functional group-containing fluoropolymer. These numerical ranges apply also to the content of the release accelerator in a cured product of the fluorine resin composition.

(4-3-4) Formation of Mold-Side Surface Layer

The thickness of the mold-side surface layer may, for example, be 1 μm to 10 μm, preferably 2 to 9 μm, and more preferably 3 μm to 8 μm.

The fluororesin composition may be produced by mixing and stirring the above-described components by means known by a person skilled in the art. For the mixing and stirring, for example, a mixer such as a high-speed mixer, a homomixer, and a paint shaker may be used. For the mixing and stirring, for example, a dissolver such as an edge-turbine high-speed dissolver may also be used.

A cured product of the fluororesin composition may be obtained as follows: the fluororesin composition is applied to a surface of the base layer, and is heated, for example, at 100° C. to 200° C., preferably at 120° C. to 180° C., for example, for 10 seconds to 240 seconds, preferably for 30 seconds to 120 seconds. The cured product forms the surface layer. The application amount of the fluororesin composition may appropriately be set by a person skilled in the art depending on the thickness of a surface layer to be formed.

In a preferred embodiment of the present technique, the mold-side surface layer comprises a cured product of a fluororesin composition containing the reactive functional group-containing fluoropolymer, the curing agent, and the particles.

More preferably, the mold-side surface layer comprises a cured product of a fluororesin composition containing a hydroxy group-containing tetrafluoroethylene polymer, an HDI polyisocyanate, and silicon dioxide particles.

The mold-side surface layer particularly contributes to making the release film of the present invention have excellent mold release properties.

(5) Physical Properties of Release Film

According to a preferred embodiment of the present invention, the tensile breaking strength of the release film of the present invention may be 40 MPa to 200 MPa, more preferably 40 MPa to 120 MPa, even more preferably 40 MPa to 110 MPa, and particularly preferably 45 MPa to 100 MPa, as determined at 175° C. in accordance with JIS K7127, and the tensile elongation at break of the release film may be 200% to 500%, more preferably 250% to 450%, and even more preferably 300% to 400%, as determined at 175° C. in accordance with JIS K7127.

A tensile breaking strength and a tensile elongation at break each within the above numerical ranges contribute to making it possible to use the release film of the present invention in molding multiple times.

The gas ($O_2$) permeability of the release film of the present invention may, for example, be 5,000 to 50,000 cc/m²·24 hr·atm, particularly 5,000 to 30,000 cc/m²·24 hr atm, and more particularly 5,000 to 20,000 cc/m²·24 hr·atm or less, as determined at 175° C. in accordance with JIS K7126-1. The release film of the present invention has such a low gas permeability. Hence, when molding is carried out with the release film of the present invention, mold contamination by gas generated from a resin can be suppressed.

The thickness of the release film of the present invention may, for example, be 30 μm to 100 μm, preferably 35 μm to 90 μm, and more preferably 40 to 80 μm. A thickness within the above numerical range makes the release film easily deformable along the shape of a mold.

2. SECOND EMBODIMENT (METHOD FOR MANUFACTURING RELEASE FILM)

The present invention also provides a method for manufacturing the release film described in "1. First embodiment (release film)". The manufacturing method comprises a surface layer forming step of forming, on one face of two faces of a base layer formed of a polyester resin, a surface layer formed of a tetrafluoroethylene resin comprising an electrically conductive filler, and the manufactured release film has a surface resistivity Rs of $1×10^{11}Ω$ or less.

The surface layer forming step, for example, comprises an applying step of applying a tetrafluoroethylene resin composition comprising an electrically conductive filler onto one face of two faces of a base layer formed of a polyester resin and, after the applying step, a curing step of curing the tetrafluoroethylene resin composition.

The description in "1. First embodiment (release film)" is applied to the base layer and the tetrafluoroethylene resin composition used in the applying step, and the explanation thereof is omitted.

The applying step may appropriately be carried out by a person skilled in the art so as to achieve an intended layer thickness. For example, the tetrafluoroethylene resin composition may be applied onto two faces of the base layer by gravure rolling, reverse rolling, offset gravure coating, kiss coating, reverse kiss coating, wire bar coating, spray coating, or impregnation coating. An apparatus for coating by such a method may appropriately be selected by a person skilled in the art.

The curing step comprises heating the fluororesin composition, for example, at 100° C. to 200° C., preferably at 120° C. to 180° C., for example, for 10 seconds to 240 seconds, preferably for 30 seconds to 120 seconds. By the heating, the fluororesin composition is cured.

To the other face of the two faces, a tetrafluoroethylene resin composition may be applied and cured, or a fluororesin composition other than the tetrafluoroethylene resin composition may be applied and cured. To the tetrafluoroethylene resin composition and the fluororesin composition, the description in "1. First embodiment (release film)" is applied. To the curing step, the explanation in the curing step for the one face is applied.

3. EXAMPLES

The present invention will next be described in more detail with reference, to examples. The examples described below are merely typical examples of the present invention, and the scope of the invention is not intended to be limited to these examples.

Comparative Example 1

As a base layer, a film formed of an easily moldable polyethylene terephthalate resin (Teleflex FT, Teijin Ltd., a thickness of 50 µm, a glass transition temperature of 90° C.) was prepared.

Next, two fluororesin compositions (hereinafter referred to as a resin composition for a mold-side surface layer and a resin composition for a molded article-side surface layer) to be applied to the film were prepared. The resin composition for a mold-side surface layer is to form a surface layer that comes into contact with a mold in a sealing step of a semiconductor device. The resin composition for a molded article-side surface layer is to form a surface layer that comes into contact with a sealing resin (molded article) in the sealing step.

The resin composition for a mold-side surface layer was prepared by mixing and stirring 100 parts by mass of a hydroxy group-containing tetrafluoroethylene polymer solution (Zeffle GK570, Daikin Industries, Ltd., containing 66% by mass of a hydroxy group-containing tetrafluoroethylene polymer), 11.47 parts by mass of amorphous silicon dioxide (Sylysia 380, Fuji Silysia Chemical Ltd.), 10 parts by mass of an isocyanurate-type polyisocyanate (a curing agent, Sumidur N3300, Sumitomo Bayer Urethane Co., Ltd.), 7.79 parts by mass of an adduct-type polyisocyanate (a curing agent, Duranate AE700-100), 6.18 parts by mass of butyl acetate, 44.62 parts by mass of ethyl acetate, and 89.25 parts by mass of MEK. The amorphous silicon dioxide had an average particle size (volume average diameter as described above) of 9.0 µm as determined with a particle size analyser (SALD-2200, Shimadzu Corporation) by laser diffraction particle size analysis.

The resin composition for a molded article-side surface layer was prepared by mixing and stirring 100 parts by mass of a hydroxy group-containing tetrafluoroethylene polymer solution (Zeffle GK570, Daikin Industries, Ltd., containing 65% by mass of a hydroxy group-containing tetrafluoroethylene polymer), 10 parts by mass of an isocyanurate-type polyisocyanate (a curing agent, Sumidur N3300, Sumitomo Bayer Urethane Co., Ltd.), 7.79 parts by mass of an adduct-type polyisocyanate (a curing agent, Duranate AE700-100), 0.31 part by mass of an amino modified-methylpolysiloxane (a release accelerator, Shin-Etsu Chemical), 6.18 parts by mass of butyl acetate, 44.62 parts by mass of ethyl acetate, and 89.25 parts by mass of MEK.

Onto one face of the film, the resin composition for a mold-side surface layer was applied, and onto the other face of the film, the resin composition for a molded article-side surface layer was applied. The application was carried out with a reverse kiss coating apparatus. After the application, these compositions were cured by heating at 150° C. for 60 seconds, giving a release film in which fluororesin layers were laminated on the corresponding faces of the easily moldable PET resin film (hereinafter referred to as "release film of Comparative Example 1").

The release film of Comparative Example 1 had a thickness of 70±5 µm. The base layer in the release film of Comparative Example 1 had a thickness of 50±5 µm. Of the two surface layers of the release film of Comparative Example 1, the mold-side surface layer as the cured product of the resin composition for a mold-side surface layer had a thickness of 5.5±0.5 µm. The molded article-side surface layer as the cured product of the resin composition for a molded article-side surface layer had a thickness of 5.5±0.5 µm.

The cured product of the resin composition for a mold-side surface layer contained 17.65 parts by mass of the amorphous silicon dioxide, 15.39 parts by mass of the isocyanurate-type polyisocyanate, and 11.98 parts by mass of the adduct-type polyisocyanate relative to 100 parts by mass of the hydroxy group-containing tetrafluoroethylene polymer.

The cured product of the resin composition for a molded article-side surface layer contained 17.65 parts by mass of the amorphous silicon dioxide, 15.39 parts by mass of the isocyanurate-type polyisocyaate, 11.98 parts by mass of the adduct-type polyisocyanate, and 0.48 part by mass of the amino modified-methylpolysiloxane relative to 100 parts by mass of the hydroxy group-containing tetrafluoroethylene polymer.

Comparative Example 2

The same procedure as in Comparative Example 1 was carried out except that the amount of the hydroxy group-containing tetrafluoroethylene polymer in the resin composition for a molded article-side surface layer was reduced by 1% by mass, and 1% by mass of ketjen black (ECP600JD, Lion Specialty Chemicals, powder) was added, giving a release film (a release film of Comparative Example 2). The ketjen black had a DEP oil absorption amount of 495 ml/100 g and an iodine adsorption number of 1,050 mg/g. The ketjen black had an average particle size of 10 µm determined by laser diffraction particle size analysis.

In other words, the amount of the hydroxy group-containing tetrafluoroethylene polymer was 99 parts by mass relative to 100 parts by mass of the hydroxy group-containing tetrafluoroethylene polymer and the ketjen black in total contained in the molded article-side surface layer of the release film of Comparative Example 2, and the amount of the ketjen black was 1 part by mass relative to 100 parts by mass of the hydroxy group-containing tetrafluoroethylene polymer and the ketjen black in total.

The amount of the ketjen black was 1.01 parts by mass relative to 100 parts by mass of the hydroxy group-containing tetrafluoroethylene polymer contained in the molded article-side surface layer of the release film of Comparative Example 2.

Example 1

The same procedure as in Comparative Example 1 was carried out except that the amount of the hydroxy group-containing tetrafluoroethylene polymer in the resin composition for a molded article-side surface layer was reduced by 3% by mass, and 3% by mass of ketjen black (ECP600JP, Lion Specialty Chemicals, powder) was added, to give a release film (a release film of Example 1).

In other words, the amount of the hydroxy group-containing tetrafluoroethylene polymer was 97 parts by mass relative to 100 parts by mass of the hydroxy group-containing tetrafluoroethylene polymer and the ketjen black in total contained in the molded article-side surface layer of the release film of Example 1, and the amount of the ketjen black was 3 part by mass relative to 100 parts by mass of the hydroxy group-containing tetrafluoroethylene polymer and the ketjen black in total.

The amount of the ketjen black was 3.09 parts by mass relative to 100 parts by mass of the hydroxy group-containing tetrafluoroethylene polymer contained in the molded article-side surface layer of the release film of Example 1.

Example 2

The same procedure as in Comparative Example 1 was carried out except that the amount of the hydroxy group-containing tetrafluoroethylene polymer in the resin composition for a molded article-side surface layer was reduced by 5% by mass, and 5% by mass of ketjen black (ECP600JP, Lion Specialty Chemicals, powder) was added, to give a release film (a release film of Example 2).

In other words, the amount of the hydroxy group-containing tetrafluoroethylene polymer was 95 parts by mass relative to 100 parts by mass of the hydroxy group-containing tetrafluoroethylene polymer and the ketjen black in total contained in the molded article-side surface layer of the release film of Example 2, and the amount of the ketjen black was 5 parts by mass relative to 100 parts by mass of the hydroxy group-containing tetrafluoroethylene polymer and the ketjen black in total.

The amount of the ketjen black was 5.26 parts by mass relative to 100 parts by mass of the hydroxy group-containing tetrafluoroethylene polymer contained in the molded article-side surface layer of the release film of Example 2.

Example 3

The same procedure as in Comparative Example 2 was carried out except that 15 parts by mass of amorphous silicon dioxide (Sylysia 380, Fuji Silysia Chemical Ltd.) was further added to a resin composition for a molded article-side surface layer relative to 100 parts by mass of the hydroxy group-containing tetrafluoroethylene polymer and the ketjen black in total, giving a release film (a release film of Example 3).

In other words, the amount of the hydroxy group-containing tetrafluoroethylene polymer was 99 parts by mass relative to 100 parts by mass of the hydroxy group-containing tetrafluoroethylene polymer and the ketjen black in total contained in the molded article-side surface layer of the release film of Example 3, and the amount of the ketjen black was 1 part by mass relative to 100 parts by mass of the hydroxy group-containing tetrafluoroethylene polymer and the ketjen black in total.

The amount of the ketjen black was 1.01 parts by mass relative to 100 parts by mass of the hydroxy group-containing tetrafluoroethylene polymer contained in the molded article-side surface layer of the release film of Example 3. The amount of the amorphous silicon dioxide particles was 15.15 parts by mass relative to 100 parts by mass of the hydroxy group-containing tetrafluoroethylene polymer contained in the molded article-side surface layer of Example 3.

Examples 4 and 5

The same procedure as in Example 1 was carried out except that 5 parts by mass or 15 parts by mass of amorphous silicon dioxide (Sylysia 380, Fuji Silysia Chemical Ltd.) was further added to a resin composition for a molded article-side surface layer relative to 100 parts by mass of the hydroxy group-containing tetrafluoroethylene polymer and the ketjen black in total, giving a release film (a release film of Example 4 or a release film of Example 5).

In other words, the amount of the hydroxy group-containing tetrafluoroethylene polymer was 97 parts by mass relative to 100 parts by mass of the hydroxy group-containing tetrafluoroethylene polymer and the ketjen black in total contained in the molded article-side surface layer of each release film of Examples 4 and 5, and the amount of the ketjen black was 3 parts by mass relative to 100 parts by mass of the hydroxy group-containing tetrafluoroethylene polymer and the ketjen black in total.

The amount of the ketjen black was 3.09 parts by mass relative, to 100 parts by mass of the hydroxy group-containing tetrafluoroethylene polymer contained in the molded article-side surface layer of each release film of Examples 4 and 5. The amounts of the amorphous silicon dioxide particles were 5.15 parts by mass and 15.46 parts by mass relative to 100 parts by mass of the hydroxy group-containing tetrafluoroethylene polymer contained in the molded article-side surface layers of the release films of Examples 4 and 5, respectively.

Examples 6 and 7

The same procedure as in Examples 4 and 5 was carried out except that Carbon ECP (Lion Specialty Chemicals) was used as the ketjen black in place of ECP600JP, giving a release film (a release film of Example 6 or a release film of Example 7). The Carbon ECP had a DBP oil absorption amount of 365 ml/100 g and an iodine adsorption number of 790 mg/g. The ketjen black had an average particle size of 10 μm determined by laser diffraction particle size analysis.

Examples 8 and 9

The same procedure as in Example 2 was carried out except that 5 parts by mass or 15 parts by mass of amorphous silicon dioxide (Sylysia 380, Fuji Silysia Chemical Ltd.) was further added to a resin composition for a molded article-side surface layer relative to 100 parts by mass of the hydroxy group-containing tetrafluoroethylene polymer and the ketjen black in total, giving a release film (a release film of Example 8 or a release film of Example 9).

In other words, the amount of the hydroxy group-containing tetrafluoroethylene polymer was 95 parts by mass relative to 100 parts by mass of the hydroxy group-containing tetrafluoroethylene polymer and the ketjen black in total contained in the molded article-side surface layer of each release film of Examples 8 and 9, and the amount of the ketjen black was 5 parts by mass relative to 100 parts by mass of the hydroxy group-containing tetrafluoroethylene polymer and the ketjen black in total.

The amount of the ketjen black was 5.26 parts by mass relative to 100 parts by mass of the hydroxy group-containing tetrafluoroethylene polymer contained in the molded article-side surface layer of each release film of Examples 8 and 9. The amounts of the amorphous silicon dioxide particles were 5.26 parts by mass and 15.79 parts by mass relative to 100 parts by mass of the hydroxy group-containing tetrafluoroethylene polymer contained in the molded article-side surface layers of the release films of Examples 8 and 9, respectively.

Example 10

As a base layer, a am formed of an easily moldable polyethylene terephthalate resin (Teleflex FT, Teijin Ltd., a thickness of 50 μm, a glass transition temperature of 90° C.) was prepared.

Next, two fluororesin compositions (hereinafter referred to as a resin composition for a mold-side surface layer and a resin composition for a molded article-side surface layer) to be applied to the film were prepared. The resin composition for a mold-side surface layer is to form a surface layer that comes into contact with a mold in a sealing step of a semiconductor device. The resin composition for a molded article-side surface layer is to form a surface layer that comes into contact with a sealing resin (molded article) in the sealing step.

The resin composition for a mold-side surface layer was the same as in Comparative Example 1.

The resin composition for a molded article-side surface layer was prepared by mixing and stirring 100 parts by mass of a hydroxy group-containing tetrafluoroethylene polymer solution (Zeffle GK570, Daikin Industries, Ltd., containing 65% by mass of a hydroxy group-containing tetrafluoroethylene polymer), 10 parts by mass of an isocyanurate-type polyisocyanate (a curing agent, Sumidur N3300, Sumitomo Bayer Urethane Co., Ltd.), 7.8 parts by mass of an adduct-type polyisocyanate (a curing agent, Duranate AE700-100), 2.78 parts by mass of ketjen black (ECP600JD, Lion Specialty Chemicals), 11.1 parts by mass of furnace black (Mitsubishi Black #10, Mitsubishi Chemical Corporation, an average particle size of 75 nm, a DBP oil absorption amount of 86 ml/100 g), 13.9 parts by mass of amorphous silicon dioxide (Sylysia 380, Fuji Silysia Chemical Ltd.), 0.6 part by mass of an amino modified-methylpolysiloxane (a release accelerator, Shin-Etsu Chemical), 56.9 parts by mass of ethyl acetate, and 113.8 parts by mass of MEK.

In a similar manner to that in Comparative Example 1, the resin composition for a mold-side surface layer and the resin composition for a molded article-side surface layer were applied to the film and were cured by heating, giving a release film in which fluororesin layers were laminated on the corresponding faces of the easily moldable PET resin film (hereinafter referred to as "a release film of Example 10").

The release film of Example 10 had a thickness of 70±5 μm. The base layer in the release film of Example 10 had a thickness of 50±5 μm. Of the two surface layers of the release film of Example 10, the mold-side surface layer as the cured product of the resin composition for a mold-side surface layer had a thickness of 5.5±0.5 μm. The molded article-side surface layer as the cured product of the resin composition for a molded article-side surface layer had a thickness of 5.5±0.5 μm.

The amount of the hydroxy group-containing tetrafluoroethylene polymer was 70 parts by mass relative to 100 parts by mass of the hydroxy group-containing tetrafluoroethylene polymer, the ketjen black, the furnace black, and the silicon dioxide particles in total contained in the molded article-side surface layer of the release film of Example 10, and the amounts of the ketjen black, the furnace black, and the silicon dioxide particles were 3 parts by mass, 12 parts by mass, and 15 parts by mass, respectively, relative to 100 parts by mass of the hydroxy group-containing tetrafluoroethylene polymer, the ketjen black, the furnace black, and the silicon dioxide particles in total.

The amounts of the ketjen black, the furnace black, and the silicon dioxide particles were 4.29 parts by mass, 17.14 parts by mass, and 21.43 parts by mass, respectively relative to 100 parts by mass of the hydroxy group-containing tetrafluoroethylene polymer contained in the molded article-side surface layer of the release film of Example 10.

Examples 11 and 12

The same procedure as in Example 10 was carried out except that Carbon ECP or ECP200L (Lion Specialty Chemicals) was used as the ketjen black in place of ECP600JD, giving a release film (a release film of Example 11 or a release film of Example 12).

Example 13

The same procedure as in Example 10 was carried out except that the amounts of the ketjen black and the furnace black were changed to 0 part by mass and 15 parts by mass, respectively relative to 100 parts by mass of the hydroxy group-containing tetrafluoroethylene polymer, the ketjen black, the furnace black, and the silicon dioxide particles in total, giving a release film.

The amounts of the ketjen black and the furnace black were 0 part by mass and 21.43 parts by mass, respectively, relative to 100 parts by mass of the hydroxy group-containing tetrafluoroethylene polymer contained in the molded article-side surface layer of the release film of Example 13.

Example 14

As a base layer, a film formed of an easily moldable polyethylene terephthalate resin (Teleflex FT, Teijin Ltd., a thickness of 50 μm, a glass transition temperature of 90° C.) was prepared.

Next, two fluororesin compositions (hereinafter referred to as a resin composition for a mold-side surface layer and a resin composition for a molded article-side surface layer) to be applied to the film were prepared. The resin composition for a mold-side surface layer is to form a surface layer that comes into contact with a mold in a sealing step of a semiconductor device. The resin composition for a molded article-side surface layer is to form a surface layer that comes into contact with a sealing resin (molded article) in the sealing step.

The resin composition for a mold-side surface layer was the same as in Comparative Example 1.

The resin composition for a molded article-side surface layer was prepared by mixing and stirring 100 parts by mass of a hydroxy group-containing tetrafluoroethylene polymer solution (Zeffle GK570, Daikin Industries, Ltd., containing 65% by mass of a hydroxy group-containing tetrafluoroethylene polymer), 10 parts by mass of an isocyanurate-type polyisocyanate (a curing agent, Sumidur N3300, Sumitomo Bayer Urethane Co., Ltd.), 7.8 parts by mass of an adduct-type polyisocyanate (a curing agent, Duranate AE700-100), 2.78 parts by mass of ketjen black (ECP600JD, Lion Specialty Chemicals), 11.1 parts by mass of furnace black (Mitsubishi Black #10, Mitsubishi Chemical Corporation), 0.6 part by mass of an amino modified-methylpolysiloxane (a release accelerator, Shin-Etsu Chemical), 48.6 parts by mass of ethyl acetate, and 97.1 parts by mass of MEK.

In a similar manner to that in Comparative Example 1, the resin composition for a mold-side surface layer and the resin composition for a molded article-side surface layer were applied to the film and were cured by heating, giving a release film in which fluororesin layers were laminated on the corresponding faces of the easily moldable PET resin film (hereinafter referred to as "a release film of Example 14").

The release film of Example 14 had a thickness of 70±5 μm. The base layer in the release film of Example 14 had a thickness of 50±5 μm. Of the two surface layers of the release film of Example 14, the mold-side surface layer as the cured product of the resin composition for a mold-side surface layer had a thickness of 5.5±0.5 μm. The molded article-side surface layer as the cured product of the resin composition for a molded article-side surface layer had a thickness of 5.5±0.5 μm.

The amount of the hydroxy group-containing tetrafluoroethylene polymer was 85 parts by mass relative to 100 parts by mass of the hydroxy group-containing tetrafluoroethylene polymer, the ketjen black, and the furnace black in total contained in the molded article-side surface layer of the release film of Example 14, and the amounts of the ketjen black and the furnace black were 3 parts by mass and 12 parts by mass, respectively; relative to 100 parts by mass of the hydroxy group-containing tetrafluoroethylene polymer, the ketjen black, and the furnace black in total.

The amounts of the ketjen black and the furnace black were 3.53 parts by mass and 14.12 parts by mass, respectively, relative to 100 parts by mass of the hydroxy group-containing tetrafluoroethylene polymer contained in the molded article-side surface layer of the release film of Example 14.

Example 15

The same procedure as in Example 14 was carried out except that the amount of the hydroxy group-containing tetrafluoroethylene polymer was changed to 92 parts by mass relative to 100 parts by mass of the hydroxy group-containing tetrafluoroethylene polymer, the ketjen black, and the furnace black in total contained in the molded article-side surface layer, and the amounts of the ketjen black and the furnace black were changed to 3 parts by mass and 5 parts by mass, respectively, relative to 100 parts by mass of the hydroxy group-containing tetrafluoroethylene polymer, the ketjen black, and the furnace black in total, giving a release film (a release film of Example 15).

The amounts of the ketjen black and the furnace black were 3.26 parts by mass and 5.43 parts by mass, respectively relative to 100 parts by mass of the hydroxy group-containing tetrafluoroethylene polymer contained in the molded article-side surface layer of the release film of Example 15.

Examples 16 and 17

The same procedure as in Example 14 or 15 was carried out except that Carbon ECP was used as the ketjen black in place of ECP600JD, giving a release film (a release film of Example 16 or a release film of Example 17).

Examples 18 and 19

The same procedure as in Example 14 or 15 was carried out except that ECP200L was used as the ketjen black in place of ECP600JD, giving a release film (a release film of Example 18 or a release film of Example 19).

The compositions of the molded article-side surface layers in the release films of Comparative Examples 1 and 2 and Examples 1 to 19 are shown in Tables 1 to 3.

TABLE 1

| | Comparative Example 1 | Comparative Example 2 | Example 1 | Example 2 | Example 3 | Example 4 |
|---|---|---|---|---|---|---|
| Amount of fluorine resin relative to 100 parts by mass of fluorine resin and ketjen black in total (parts by mass) | 100 | 99 | 97 | 95 | 99 | 97 |
| Amount of ketjen black relative to 100 parts by mass of fluorine resin and ketjen black in total (parts by mass) | 0 | 1 | 3 | 5 | 1 | 3 |
| Amount of silicon dioxide particles relative to 100 parts by mass fluorine resin and ketjen black in total (parts by mass) | 0 | 0 | 0 | 0 | 15 | 5 |
| Amount of ketjen black relative to 100 parts by mass of fluorine resin (parts by mass) | 0 | 1.01 | 3.09 | 5.26 | 1.01 | 3.09 |
| Amount of silicon dioxide particles relative to 100 parts by mass of fluorine resin (parts by mass) | 0 | 0 | 0 | 0 | 15.15 | 5.15 |
| Ketjen black type | — | ECP600JD | ECP600JD | ECP600JD | ECP600JD | ECP600JD |
| Surface resistivity [Ω] | 1.8.E+15 | 1.8.E+13 | 6.8.E+06 | 1.0.E+07 | 4.9.E+09 | 3.5.E+06 |
| Surface resistivity evaluation result | C | C | A | A | B | A |
| Dispersibility evaluation result | — | C | C | C | B | B |
| Appearance evaluation result | A | C | C | C | B | B |

TABLE 1-continued

|  | Example 5 | Example 6 | Example 7 | Example 8 | Example 9 |
|---|---|---|---|---|---|
| Amount of fluorine resin relative to 100 parts by mass of fluorine resin and ketjen black in total (parts by mass) | 97 | 97 | 97 | 95 | 95 |
| Amount of ketjen black relative to 100 parts by mass of fluorine resin and ketjen black in total (parts by mass) | 3 | 3 | 3 | 5 | 5 |
| Amount of silicon dioxide particles relative to 100 parts by mass fluorine resin and ketjen black in total (parts by mass) | 15 | 5 | 15 | 5 | 15 |
| Amount of ketjen black relative to 100 parts by mass of fluorine resin (parts by mass) | 3.09 | 3.09 | 3.09 | 5.26 | 5.26 |
| Amount of silicon dioxide particles relative to 100 parts by mass of fluorine resin (parts by mass) | 15.46 | 5.15 | 15.46 | 5.26 | 15.79 |
| Ketjen black type | ECP600JD | Carbon ECP | Carbon ECP | ECP600JD | ECP600JD |
| Surface resistivity [$\Omega$] | 1.0.E+07 | 3.4.E+07 | 2.6.E+06 | 1.4.E+07 | 1.0.E+07 |
| Surface resistivity evaluation result | A | A | A | A | A |
| Dispersibility evaluation result | B | B | B | B | B |
| Appearance evaluation result | B | B | B | B | B |

TABLE 2

|  | Example 10 | Example 11 | Example 12 | Example 13 |
|---|---|---|---|---|
| Amount of fluorine resin relative to 100 parts by mass of fluorine resin, ketjen black, furnace black, and silicon dioxide particles in total (parts by mass) | 70 | 70 | 70 | 70 |
| Amount of ketjen black relative to 100 parts by mass of fluorine resin, ketjen black, furnace black, and silicon dioxide particles in total (parts by mass) | 3 | 3 | 3 | 0 |
| Amount of furnace black relative to 100 parts by mass of fluorine resin, ketjen black, furnace black, and silicon dioxide particles in total (parts by mass) | 12 | 12 | 12 | 15 |
| Amount of silicon dioxide particles relative to 100 parts by mass of fluorine resin, ketjen black, furnace black, and silicon dioxide particles in total (parts by mass) | 15 | 15 | 15 | 15 |
| Amount of ketjen black relative to 100 parts by mass of fluorine resin (parts by mass) | 4.29 | 4.29 | 4.29 | 0.00 |
| Amount of furnace black relative to 100 parts by mass of fluorine resin (parts by mass) | 17.14 | 17.14 | 17.14 | 21.43 |
| Amount of silicon dioxide particles relative to 100 parts by mass of fluorine resin (parts by mass) | 21.43 | 21.43 | 21.43 | 21.43 |
| Ketjen black type | ECP600JD | Carbon ECP | ECP200L | — |
| Surface resistivity [$\Omega$] | 1.2.E+05 | 8.2.E+05 | 5.4.E+05 | 2.0.E+07 |
| Surface resistivity evaluation result | A | A | A | A |
| Dispersibility evaluation result | A | A | A | A |
| Appearance evaluation result | A | A | A | A |

TABLE 3

| | Example 14 | Example 15 | Example 16 | Example 17 | Example 18 | Example 19 |
|---|---|---|---|---|---|---|
| Amount of fluorine resin relative to 100 parts by mass of fluorine resin, ketjen black, and furnace black in total (parts by mass) | 85 | 92 | 85 | 92 | 85 | 92 |
| Amount of ketjen black relative to 100 parts by mass of fluorine resin, ketjen black, and furnace black in total (parts by mass) | 3 | 3 | 3 | 3 | 3 | 3 |
| Amount of furnace black relative to 100 parts by mass of fluorine resin, ketjen black, and furnace black in total (parts by mass) | 12 | 5 | 12 | 5 | 12 | 5 |
| Amount of ketjen black relative to 100 parts by mass of fluorine resin (parts by mass) | 3.53 | 3.26 | 3.53 | 3.26 | 3.53 | 3.26 |
| Amount of acetylene black relative to 100 parts by mass of fluorine resin (parts by mass) | 14.12 | 5.43 | 14.12 | 5.43 | 14.12 | 5.43 |
| Ketjen black type | ECP600JD | ECP600JD | Carbon ECP | Carbon ECP | ECP200L | ECP200L |
| Surface resistivity [Ω] | 1.7.E+05 | 3.4.E+05 | 3.6.E+05 | 9.7.E+05 | 1.0.E+06 | 3.1.E+06 |
| Surface resistivity evaluation result | A | A | A | A | A | A |
| Dispersibility evaluation result | A | A | A | A | A | A |
| Appearance evaluation result | B | B | B | B | B | B |

The surface resistivity Rs of the molded article-side surface layer of each release film of Comparative Examples 1 and 2 and Examples 1 to 19 was determined and evaluated in accordance with the following criteria. In Tables, "E+" in surface resistivity Rs means exponent of 10, and for example, "4.9.E+09" in Example 3 means $4.9 \times 10^9$. The same is applied to surface resistivities Rs in other examples. The evaluation results are shown in Tables 1 to 3.

A: Rs is not more than $1 \times 10^9 \Omega$.

B: Rs is more than $1 \times 10^9 \Omega$ and not ore than $1 \times 10^{11} \Omega$.

C: Rs is more than $1 \times 10^{11} \Omega$.

In preparation of the resin compositions for a molded article-side surface layer in manufacturing the release films of Comparative Examples 1 and 2 and Examples 1 to 19, the dispersibility of carbon black in each composition was evaluated. The dispersibility was evaluated with a grind gauge (Model 232 Grindometer manufactured by Erichsen) in accordance with JIS K5600-2-5. The evaluation results are shown in Tables 1 to 3.

A: No lines are observed.

B: Lines having a groove depth of 35 μm or less are observed.

C: Lines having a groove depth of 40 μm or less are observed.

The appearance of the molded article-side surface of each release film of Comparative Examples 1 and 2 and Examples 1 to 19 was visually evaluated. The evaluation criteria are shown below. The evaluation results are shown in Tables 1 to 3.

A: A surface is uniformly black.

B: A surface is slightly nonuniformly black.

C: A surface is nonuniformly black.

The evaluation results shown in Tables 1 to 3 reveal the followings.

It is revealed that each release film of Examples 1 to 19 has a surface resistivity Rs of $1 \times 10^{11} \Omega$ or less and has an electrostatic dissipative property.

The molded article-side surface layer of the release film of Comparative Example 1 contained no carbon black and had a surface resistivity Rs of more than $1 \times 10^{11} \Omega$. The molded article-side surface layer of the release film of Comparative Example 2 contained ketjen black but had a surface resistivity Rs of more than $1 \times 10^{11} \Omega$. In contrast, in Examples 1 and 2 in which the content of ketjen black was higher than in Comparative Example 2, the surface resistivity Rs was $1 \times 10^{11} \Omega$ or less. These results reveal that when the electrically conductive filler is ketjen black, and the content of the ketjen black is, for example, 3 parts by mass or more relative to 100 parts by mass of the reactive functional group-containing tetrafluoroethylene polymer, the electrostatic dissipative property can be imparted to a release film.

The molded article-side surface layer of the release film of Comparative Example 2 contained ketjen black but had a surface resistivity Rs of more than $1 \times 10^{11} \Omega$. In contrast, the release film of Example 3, which contained ketjen black in the same amount but further contained silicon dioxide particles, had a surface resistivity Rs of $1 \times 10^{11} \Omega$ or less. These results reveal that a combination of ketjen black and silicon dioxide particles can impart an electrostatic dissipative property to a release film. These results also reveal that when silicon dioxide particles are contained, a smaller amount of ketjen black can impart an electrostatic dissipative property to a release film. For example, when silicon dioxide particles are contained, the amount of ketjen black may be 1 part by mass or more relative to 100 parts by mass of a reactive functional group-containing tetrafluoroethylene polymer.

A comparison of the release films of Examples 3 and 5 reveals that when silicon dioxide particles are contained, and ketjen black is contained in an amount of 3 parts by mass or more relative to 100 parts by mass of a reactive functional group-containing tetrafluoroethylene polymer, the electrostatic dissipative property of a release film can be improved.

A comparison between the release films of Examples 4 and 5 and the release films of Examples 6 and 7 reveals that even when the type of ketjen black is changed, a good electrostatic dissipative property is achieved.

A comparison between the release films of Examples 4 and 5 and the release films of Examples 8 and 9 reveals that even when a larger amount of ketjen black is contained, a good electrostatic dissipative property is achieved.

A comparison of the release films of Examples 1 and 5 reveals that when silicon dioxide particles are contained in addition to ketjen black, the dispersibility of a composition for preparing a molded article-side surface layer can be improved, and the appearance of a produced molded article-side surface layer can be improved.

In Examples 3 to 9, the electrostatic dissipative property was evaluated as A, whereas the dispersibility and the appearance were evaluated as B. In contrast, in Examples 10 to 12, the electrostatic dissipative property was evaluated as A, and the dispersibility and the appearance were also evaluated as A. These results reveal that when furnace black is contained in addition to ketjen black and silicon dioxide particles, a good electrostatic dissipative property is achieved, the dispersibility of a composition for preparing a molded article-side surface layer is improved, and the appearance of a produced molded article-side surface layer can be improved.

A comparison between Examples 10 to 12 and Example 13 reveals that a combination of furnace black and silicon dioxide particles can also achieve a good electrostatic dissipative property improve the dispersibility of a composition for preparing a molded article-side surface layer, and improve the appearance of a produced molded article-side surface layer.

The results of Examples 14 to 18 reveal that a combination of ketjen black and furnace black can also achieve a good electrostatic dissipative property. The results also reveal that this combination can improve the dispersibility of a composition for preparing a molded article-side surface layer. Although the degree of improvement is lower than in Examples 10 to 12 containing silicon dioxide particles, the results of Examples 14 to 18 reveal that the combination can improve the appearance of a molded article-side surface layer.

The release films of Comparative Examples 1 and 2 and Examples 1 to 19 were used to carry out molding of an epoxy resin by transfer molding. The molding was carried out as shown in FIG. 2. As a result, the molded article of an epoxy resin was smoothly released from each release film. The result reveals that the molded article-side surface layer of the release film of the present invention, which comprises an electrically conductive filler, has substantially the same mold release properties as those of a film comprising no electrically conductive filler. The mold release properties of each release film of Comparative Examples 1 and 2 and Examples 1 to 19 were maintained through multiple molding operations.

REFERENCE SIGNS LIST 100 release film
101 base layer
102 surface layer
103 surface layer

The invention claimed is:

1. A release film, comprising:
a base layer comprised of a polyester resin; and
a surface layer comprised of a tetrafluoroethylene resin comprising an electrically conductive filler,
wherein:
the release film has a surface resistivity (Rs) of $1 \times 10^{11} \Omega$ or less, the electrically conductive filler comprises carbon black,
the tetrafluoroethylene resin is a cured product which comprises a reactive functional group-containing tetrafluoroethylene polymer and a curing agent,
the reactive functional group-containing tetrafluoroethylene polymer comprises a polymer unit based on a hydroxy group-containing monomer and a polymer unit based on perfluoroolefin comprising tetrafluoroethylene and one or more of hexafluoropropylene and perfluoro (alkyl vinyl ethers),
the tetrafluoroethylene resin comprises silicon dioxide particles each having an average particle size of 1 μm to 15 μm, as determined by laser diffraction particle size analysis, and
an amount of the silicon dioxide particles relative to 100 parts by mass of the tetrafluoroethylene resin is 5.15 parts by mass to 15.79 parts by mass.

2. The release film according to claim 1, wherein the carbon black comprises ketjen black.

3. The release film according to claim 2, wherein the ketjen black has a dibutyl phthalate (DBP) oil absorption amount of 250 ml/100 g or more.

4. The release film according to claim 1, wherein the carbon black further comprises furnace black, and wherein a DBP oil absorption amount of the furnace black is 200 ml/100 g or less.

5. The release film according to claim 1, wherein the carbon black further comprises a ketjen black, and wherein the ketjen black has an average particle size of 1 μm to 20 μm, as determined by laser diffraction particle size analysis.

6. The release film according to claim 1, wherein the carbon black further comprises a furnace black, and wherein the furnace black has an average particle size of 30 nm to 150 nm, as determined by electron microscopy particle size analysis.

7. The release film according to claim 1, wherein the curing agent is an isocyanate curing agent.

8. The release film according to claim 7, wherein the isocyanate curing agent is: (i) a single polyisocyanate, or (ii) hexamethylene diisocyanate (HDI) polyisocyanate and one or more polyisocyanates selected from isocyanurate-containing polyisocyanates, adduct-containing polyisocyanates, and biuret-containing polyisocyanates.

9. The release film according to claim 1, wherein an amount of the electrically conductive filler contained in the tetrafluoroethylene resin composition is 1 part by mass to 25 parts by mass relative to 100 parts by mass of the reactive functional group-containing tetrafluoroethylene polymer.

10. The release film according to claim 1, wherein the polyester resin is a polyethylene terephthalate resin.

11. The release film according to claim 1, wherein the polyester resin has a glass transition temperature of 60° C. to 95° C.

12. The release film according to claim 1, wherein the surface layer is laminated on one face of two faces of the base layer.

13. The release film according to claim 12, wherein on another face of the two faces of the base layer, a surface layer comprised of a fluororesin is laminated.

14. The release film according to claim 1, wherein, when sealing a semiconductor with the release film, the release film is placed so that the surface layer that is comprised of the tetrafluoroethylene resin comprising the electrically conductive filler comes into contact with a sealing resin.

15. A method for manufacturing a release film, the method comprising:

a surface layer forming step of forming, on one face of two faces of a base layer that is comprised of a polyester resin, a surface layer comprised of a tetrafluoroethylene resin comprising an electrically conductive filler, wherein:

the electrically conductive filler comprises carbon black, the tetrafluoroethylene resin is a cured product of a tetrafluoroethylene resin composition containing a reactive functional group-containing tetrafluoroethylene polymer and a curing agent, the reactive functional group-containing tetrafluoroethylene polymer contains a polymer unit based on a hydroxy group-containing monomer and a polymer unit based on perfluoroolefin comprising at least tetrafluoroethylene and one or more of hexafluoropropylene and perfluoro (alkyl vinyl ethers), the tetrafluoroethylene resin comprises silicon dioxide particles, an average particle size of the silicon dioxide particles is 1 μm to 15 μm, as determined by laser diffraction particle size analysis, an amount of the silicon dioxide particles relative to 100 parts by mass of the tetrafluoroethylene resin is 5.15 parts by mass to 15.79 parts by mass, and the manufactured release film has a surface resistivity Rs of $1 \times 10^{11} \Omega$ or less.

16. The method according to claim 15, wherein in the surface layer forming step, the tetrafluoroethylene resin composition applied to the surface of the base layer is cured to form the cured product.

* * * * *